US011229989B2

(12) United States Patent
Bilen et al.

(10) Patent No.: US 11,229,989 B2
(45) Date of Patent: Jan. 25, 2022

(54) METHODS OF FORMING CUTTING ELEMENTS WITH CUTTING FACES EXHIBITING MULTIPLE COEFFICIENTS OF FRICTION, AND RELATED METHODS

(71) Applicant: Baker Hughes Holdings LLC, Houston, TX (US)

(72) Inventors: Juan Miguel Bilen, The Woodlands, TX (US); Anthony A. DiGiovanni, Houston, TX (US); Chih C. Lin, Huntsville, TX (US); Suresh G. Patel, The Woodlands, TX (US); Rudolf Carl Pessier, Houston, TX (US); Danny E. Scott, Montgomery, TX (US); Michael L. Doster, Spring, TX (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 128 days.

(21) Appl. No.: 15/793,077

(22) Filed: Oct. 25, 2017

(65) Prior Publication Data

US 2018/0043509 A1 Feb. 15, 2018

Related U.S. Application Data

(62) Division of application No. 14/660,716, filed on Mar. 17, 2015, now Pat. No. 9,821,437, which is a division
(Continued)

(51) Int. Cl.
*E21B 10/567* (2006.01)
*B24D 18/00* (2006.01)
(Continued)

(52) U.S. Cl.
CPC ........ *B24D 18/009* (2013.01); *B23K 26/3584* (2018.08); *E21B 10/567* (2013.01);
(Continued)

(58) Field of Classification Search
CPC . B24D 18/009; B23K 26/3584; E21B 10/567; E21B 10/42; E21B 10/54;
(Continued)

(56) References Cited

U.S. PATENT DOCUMENTS 2,952,951 A * 9/1960 Simpson ................ B24D 7/063
451/529
4,224,380 A 9/1980 Bovenkerk et al.
(Continued)

FOREIGN PATENT DOCUMENTS

CN 2278759 Y 4/1998
CN 2579580 Y 10/2003
(Continued)

OTHER PUBLICATIONS

European Office Action for European Application No. 13785153.1, dated Mar. 30, 2017, 4 pages.
(Continued)

*Primary Examiner* — Yong-Suk (Philip) Ro
(74) *Attorney, Agent, or Firm* — TraskBritt

(57) ABSTRACT

An earth-boring tool having at least one cutting element with a multi-friction cutting face provides for the steering of formation cuttings as the cuttings slide across the cutting face. The multi-friction cutting element includes a diamond table bonded to a substrate of superabrasive material. The diamond table has a cutting face formed thereon with a cutting edge extending along a periphery of the cutting face. The cutting face has a first area having an average surface finish roughness less than an average surface finish roughness of a second area of the cutting face, the two areas separated by a boundary having a proximal end proximate a tool crown and a distal end remote from the tool crown.

17 Claims, 13 Drawing Sheets

Related U.S. Application Data of application No. 13/461,388, filed on May 1, 2012, now Pat. No. 8,991,525.

(51) Int. Cl.
  *B23K 26/352* (2014.01)
  *B23P 15/28* (2006.01)

(52) U.S. Cl.
  CPC .......... *E21B 10/5676* (2013.01); *B23P 15/28* (2013.01); *E21B 10/5671* (2020.05)

(58) Field of Classification Search
  CPC .. E21B 2010/566; E21B 10/5676; E21B 3/00; E21B 10/34; E21B 7/021; B23P 15/28
  See application file for complete search history.

(56) References Cited

U.S. PATENT DOCUMENTS

| | | |
|---|---|---|
| 4,538,690 A | 9/1985 | Short, Jr. |
| 4,539,018 A | 9/1985 | Whanger et al. |
| 4,558,753 A | 12/1985 | Barr |
| 4,593,777 A | 6/1986 | Barr |
| 4,629,373 A | 12/1986 | Hall |
| 4,858,707 A | 8/1989 | Jones et al. |
| 4,872,520 A | 10/1989 | Nelson |
| 4,984,642 A | 1/1991 | Renard |
| 4,997,049 A | 3/1991 | Tank |
| 5,007,207 A | 4/1991 | Phaal |
| 5,027,912 A | 7/1991 | Juergens |
| 5,054,246 A | 10/1991 | Phaal et al. |
| 5,078,219 A | 1/1992 | Morrell et al. |
| 5,127,923 A | 7/1992 | Bunting et al. |
| 5,172,778 A | 12/1992 | Tabbitts et al. |
| 5,333,699 A | 8/1994 | Thigpen et al. |
| 5,351,772 A | 10/1994 | Smith et al. |
| 5,355,969 A | 10/1994 | Hardy et al. |
| 5,377,773 A | 1/1995 | Tibbitts |
| 5,437,343 A | 8/1995 | Cooley et al. |
| 5,449,048 A | 9/1995 | Thigpen |
| 5,477,208 A | 12/1995 | Henderson et al. |
| 5,533,582 A | 7/1996 | Tibbitts |
| 5,549,171 A | 8/1996 | Mensa-Wilmot et al. |
| 5,569,000 A | 10/1996 | Littecke et al. |
| 5,607,024 A | 3/1997 | Keith et al. |
| 5,653,300 A | 8/1997 | Lund et al. |
| 5,881,830 A | 3/1999 | Cooley |
| 5,890,552 A | 4/1999 | Scott et al. |
| 5,944,129 A | 8/1999 | Jensen |
| 5,967,250 A | 10/1999 | Lund et al. |
| 5,984,005 A | 11/1999 | Hart et al. |
| 6,006,846 A | 12/1999 | Tibbitts et al. |
| 6,026,919 A | 2/2000 | Thigpen et al. |
| 6,045,440 A | 4/2000 | Johnson et al. |
| 6,050,354 A | 4/2000 | Pessler |
| 6,059,054 A | 5/2000 | Portwood et al. |
| 6,065,554 A | 5/2000 | Taylor et al. |
| 6,068,071 A | 5/2000 | Jurewicz |
| 6,145,608 A * | 11/2000 | Lund .................... B23B 27/145 175/428 |
| 6,164,394 A | 12/2000 | Mensa-Wilmot et al. |
| 6,187,068 B1 | 2/2001 | Frushour et al. |
| 6,196,340 B1 | 3/2001 | Jensen et al. |
| 6,196,910 B1 | 3/2001 | Johnson et al. |
| 6,202,770 B1 | 3/2001 | Jurewicz et al. |
| 6,202,771 B1 | 3/2001 | Scott et al. |
| 6,216,805 B1 | 4/2001 | Lays et al. |
| 6,220,376 B1 | 4/2001 | Lundell |
| 6,227,319 B1 | 5/2001 | Radford |
| 6,328,117 B1 | 12/2001 | Berzas et al. |
| 6,450,271 B1 | 9/2002 | Tibbitts et al. |
| 6,488,106 B1 | 12/2002 | Dourfaye |
| 6,524,363 B2 | 2/2003 | Gates, Jr. et al. |
| 6,527,065 B1 | 3/2003 | Tibbitts et al. |
| 6,550,556 B2 | 4/2003 | Middlemiss et al. |
| 6,935,444 B2 | 8/2005 | Lund et al. |
| 6,962,218 B2 | 11/2005 | Eyre |
| 7,000,715 B2 | 2/2006 | Sinor et al. |
| 7,188,692 B2 | 3/2007 | Lund et al. |
| 7,363,992 B2 | 4/2008 | Stowe et al. |
| 7,373,998 B2 | 5/2008 | Cariveau et al. |
| D570,384 S | 6/2008 | Morozov |
| 7,493,972 B1 | 2/2009 | Schmidt et al. |
| 7,533,740 B2 | 5/2009 | Zhang et al. |
| 7,740,090 B2 | 6/2010 | Shen et al. |
| 7,757,790 B1 | 7/2010 | Schmidt et al. |
| 7,814,998 B2 | 10/2010 | Patel et al. |
| 7,861,808 B2 | 1/2011 | Zhang et al. |
| 8,016,054 B2 | 9/2011 | Lancaster et al. |
| 8,061,456 B2 | 11/2011 | Patel et al. |
| 8,191,656 B2 | 6/2012 | Dourfaye |
| 8,210,288 B2 | 7/2012 | Chen |
| 8,240,405 B2 | 8/2012 | Lancaster et al. |
| 8,469,121 B2 | 6/2013 | Lancaster et al. |
| 8,684,112 B2 | 4/2014 | DiGiovanni et al. |
| 8,739,904 B2 | 6/2014 | Patel |
| D712,941 S | 9/2014 | Mo |
| 8,833,492 B2 | 9/2014 | Durairajan et al. |
| 8,991,525 B2 * | 3/2015 | Bilen ................ E21B 10/5676 175/428 |
| 9,821,437 B2 * | 11/2017 | Bilen ................ E21B 10/5676 |
| 2004/0009376 A1 | 1/2004 | Wan et al. |
| 2005/0247492 A1 | 11/2005 | Shen et al. |
| 2005/0269139 A1 | 12/2005 | Shen et al. |
| 2006/0201712 A1 | 9/2006 | Zhang et al. |
| 2007/0235230 A1 | 10/2007 | Cuillier et al. |
| 2008/0006448 A1 | 1/2008 | Zhang et al. |
| 2008/0035380 A1 | 2/2008 | Hall et al. |
| 2008/0164071 A1 | 7/2008 | Patel et al. |
| 2008/0264696 A1 | 10/2008 | Dourfaye et al. |
| 2008/0308321 A1 | 12/2008 | Aliko et al. |
| 2009/0008155 A1 | 1/2009 | Sherwood, Jr. |
| 2009/0057031 A1 | 3/2009 | Patel et al. |
| 2009/0114628 A1 | 5/2009 | DiGiovanni |
| 2009/0260877 A1 | 10/2009 | Wirth |
| 2009/0321146 A1 | 12/2009 | Dick et al. |
| 2010/0084198 A1 | 4/2010 | Durairajan et al. |
| 2010/0104874 A1 | 4/2010 | Yong et al. |
| 2010/0108403 A1 | 5/2010 | Keshavan |
| 2010/0243337 A1 | 9/2010 | Scott |
| 2010/0276200 A1 | 11/2010 | Schwefe et al. |
| 2010/0288564 A1 | 11/2010 | Dovalina et al. |
| 2010/0307829 A1 | 12/2010 | Patel |
| 2010/0326741 A1 | 12/2010 | Patel |
| 2010/0326742 A1 | 12/2010 | Vempati et al. |
| 2011/0000714 A1 | 1/2011 | Durairajan |
| 2011/0031030 A1 | 2/2011 | Shen et al. |
| 2011/0031031 A1 | 2/2011 | Vempati et al. |
| 2011/0031036 A1 | 2/2011 | Patel |
| 2011/0088950 A1 | 4/2011 | Scott et al. |
| 2011/0171414 A1 | 7/2011 | Sreshta |
| 2011/0259642 A1 * | 10/2011 | DiGiovanni .......... B24D 18/00 175/57 |
| 2011/0303466 A1 | 12/2011 | DiGiovanni |
| 2012/0037431 A1 | 2/2012 | DiGiovanni et al. |
| 2012/0132468 A1 * | 5/2012 | Scott .................. B01J 3/062 175/50 |
| 2012/0205162 A1 | 8/2012 | Patel et al. |
| 2013/0068534 A1 | 3/2013 | DiGiovanni et al. |
| 2013/0068537 A1 | 3/2013 | DiGiovanni |
| 2013/0068538 A1 | 3/2013 | DiGiovanni et al. |
| 2013/0292188 A1 | 11/2013 | Bilen et al. |
| 2014/0238753 A1 | 8/2014 | Nelms et al. |
| 2014/0246252 A1 * | 9/2014 | Scott .................. E21B 10/56 175/428 |
| 2014/0246253 A1 | 9/2014 | Patel et al. |
| 2015/0190904 A1 | 7/2015 | Bilen et al. |
| 2016/0069140 A1 | 3/2016 | Patel et al. |

FOREIGN PATENT DOCUMENTS

| | | |
|---|---|---|
| CN | 1714224 A | 12/2005 |
| CN | 201024900 Y | 2/2008 |

(56) References Cited

FOREIGN PATENT DOCUMENTS

| | | | |
|---|---|---|---|
| CN | 201202408 | Y | 3/2009 |
| EP | 546725 | A1 | 6/1993 |
| EP | 835981 | A2 | 4/1998 |
| EP | 656458 | B1 | 2/1999 |
| EP | 0979699 | | 2/2000 |
| WO | 9415058 | A1 | 7/1994 |
| WO | 9427769 | A1 | 12/1994 |
| WO | 0048789 | | 8/2000 |
| WO | 0160554 | A1 | 8/2001 |
| WO | 2008006010 | A3 | 1/2008 |

OTHER PUBLICATIONS

Supplementary European Search Report and Opinion for European Application No. 13785153, dated Feb. 18, 2016, 8 Pages.
GUILIN Color Engineered Diamond Technology (EDT) Co. Ltd., Brochure, Offshore Technology Conference Apr. 30-May 3, 2012.
GUILIN Star Diamond Superhard Material Co. Ltd., Brochure, Offshore Technology Conference Apr. 30-May 3, 2012.
International Preliminary Report on Patentability for International Application No. PCT/US2013/038973 dated Nov. 4, 2014, 9 pages.
International Search Report for International Application No. PCT/US2013/038973 dated Sep. 17, 2013, 4 pages.
International Written Opinion for International Application No. PCT/US2013/038973 dated Sep. 17, 2013, 8 pages.
PILKEY in Peterson's Stress Concentration Factors (2d ed., Wiley Interscience 1997), in Section 2.6.6, on p. 71 (1997).
Chinese Fourth Office Action for Chinese Application No. 201580056595, dated Dec. 18, 2019, 8 pages with English Translation.

* cited by examiner

METHODS OF FORMING CUTTING ELEMENTS WITH CUTTING FACES EXHIBITING MULTIPLE COEFFICIENTS OF FRICTION, AND RELATED METHODS

CROSS-REFERENCE TO RELATED APPLICATION

This application is a divisional of U.S. patent application Ser. No. 14/660,716, filed Mar. 17, 2015, now U.S. Pat. No. 9,821,437, issued Nov. 21, 2017, which is a divisional of U.S. patent application Ser. No. 13/461,388, filed May 1, 2012, now U.S. Pat. No. 8,991,525, issued Mar. 31, 2015, the disclosure of which is hereby incorporated herein in its entirety by this reference. This application is also related to U.S. patent application Ser. No. 14/480,293, filed Sep. 8, 2014, now U.S. Pat. No. 9,650,837, issued May 16, 2017, for "Multi-Chamfer Cutting Elements Having a Shaped Cutting Face and Earth-Boring Tools Including Such Cutting Elements," and to U.S. patent application Ser. No. 13/840,195, filed Mar. 15, 2013, now U.S. Pat. No. 9,428,966, issued Aug. 30, 2016, for "Cutting Elements for Earth-Boring Tools, Earth-Boring Tools Including Such Cutting Elements, and Related Methods," which is a utility conversion of U.S. Provisional Patent Application Ser. No. 61/771,699, filed Mar. 1, 2013, for "Cutting Elements for Earth-Boring Tools Including Such Cutting Elements, and Related Methods."

TECHNICAL FIELD

The present disclosure relates to cutting elements for earth-boring tools having cutting surfaces with two or more areas exhibiting different frictional characteristics, and to methods of forming such devices.

BACKGROUND

Earth-boring tools for forming wellbores in subterranean earth formations may include a plurality of cutting elements secured to a body. For example, fixed-cutter earth-boring rotary drill bits (also referred to as "drag bits"), reamers, back-up cutters, drilling-with casing tools, reaming-with casing tools, and exit mills may include a plurality of cutting elements that are fixedly attached to a body of the tool.

The cutting elements used in such earth-boring tools often include polycrystalline diamond compact (often referred to as "PDC") cutting elements, which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as, for example, cobalt, iron, nickel, or alloys and mixtures thereof) to form a layer of polycrystalline diamond material on a cutting element substrate. These processes are often referred to as high temperature/high pressure (or "HTHP") processes. The cutting element substrate may comprise a cermet material (i.e., a ceramic-metal composite material) such as cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HTHP process.

PDC cutting elements commonly have a planar, disc-shaped diamond table on an end surface of a cylindrical cemented carbide substrate. Such a PDC cutting element may be mounted to an earth-boring rotary drag bit or other drilling or reaming tool using fixed PDC cutting elements in a position and orientation that causes a peripheral edge of the diamond table to scrape against and shear away the surface of the formation being cut as the tool is rotated within a wellbore. Other types of cutting elements, such as carbide cutting elements or carbide-covered PDC cutting elements are also used in subterranean drilling operations. It has been found that cutting elements having a cutting face with a surface finish roughness in the range of 0.3 microinch (0.3 µin.) to 2.0 microinches (2.0 µin.) root mean square (RMS), which may be referred to as a "polished" cutting face, exhibit favorable performance characteristics as the cutting element shears formation material from the formation being cut, including, for example, the shearing of formation chips of uniform thickness that slide in a substantially unimpeded manner up the cutting face of the cutting element instead of agglomerating as a mass on the cutting face, accumulating in a fluid course rotationally ahead of the cutting element and potentially causing "balling" of formation material on the tool face, resulting in severe degradation of drilling performance of the rotary drag bit or other drilling or reaming tool.

The drilling action of the tool generates cuttings of subterranean formation material at a cutting edge of the cutting element, which cuttings or "chips" travel on the cutting face of the cutting element toward the evacuation areas of the tool, such as junk slots, and from there to the surface transported by drilling mud.

BRIEF SUMMARY

This summary does not identify key features or essential features of the claimed subject matter, nor does it limit the scope of the claimed subject matter.

In some embodiments, the present disclosure includes an earth-boring tool with a tool crown and at least one cutting element attached thereon. The cutting element comprises a superabrasive material and has a cutting face with a cutting edge extending along a periphery of the cutting face. The cutting face comprises at least a first area and at least a second area. The at least a first area has a first average surface roughness, and the at least a second area has a second average surface roughness which is greater than the average surface roughness of the at least a first area.

The first at least a first area and the at least a second area of the cutting face are located in a manner to cause the at least a second area to provide a greater sliding friction force than a greater sliding friction force provided by the at least a first area to a chip of subterranean formation material as the chip moves over the cutting face. This friction differential between the at least a first area and the at least a second area may impede movement of the chip over the at least a second area, causing the chip to move in a desired direction over the cutting face and enable "steering" of the chip.

In yet other embodiments, the present disclosure includes a method of forming an earth-boring tool. The method includes attaching a plurality of cutting elements to a tool crown. At least one of the cutting elements has a cutting face provided thereon. The cutting face has at least a first area and at least a second area, the at least a first area having an average surface roughness less than an average surface roughness of the at least a second area. The method also includes orienting a boundary between the at least a first area and the at least a second area so that a proximal end of the boundary is adjacent to a profile of the tool crown at the location of attachment on the tool crown and a distal end of the boundary is remote from the tool crown.

BRIEF DESCRIPTION OF THE DRAWINGS

FIG. 9 illustrates a front elevation view of a cutting face having a second area with a coefficient of sliding friction greater than a coefficient of sliding friction of a first area, a boundary between the first and second areas is linear and coincides with the vertical centerline of the cutting face, the first and second areas are oriented to urge a chip toward the second area and laterally away from the center of the cutting face.

FIG. 10 illustrates a front elevation view of a cutting face having an arcuate boundary between the first and second areas of the cutting face, the first and second areas are oriented to urge the chip toward the second area of the cutting face and laterally away from the center of the cutting face.

FIG. 11 illustrates a front elevation view of a cutting face having the first and second areas oriented at an acute angle with respect to the vertical centerline of the cutting face, the first and second areas are oriented to urge the chip toward the second area of the cutting face and away from the center of the cutting face.

FIG. 13 illustrates a front elevation view of a cutting face wherein the second area occupies one quadrant of the cutting face.

FIG. 14 illustrates a front elevation view of a cutting face wherein the first and second areas each occupy two non-consecutive quadrants of the cutting face.

FIG. 15 illustrates a front elevation view of a cutting face wherein the first and second areas are divided into sectors of non-equivalent surface area by a linear boundary that does not extend through the center of the cutting face, the boundary being oriented at an angle with respect to the vertical centerline of the cutting face.

FIG. 16 illustrates a front elevation view of a cutting face wherein the second area comprises two sectors on either side of the first area, the first area having two opposite linear boundaries with the second area, each boundary being oriented at an angle with respect to the vertical centerline of the cutting face.

FIG. 17 illustrates a front elevation view of a cutting face wherein the second area comprises two sections on either side of the first area, the first area having two opposite arcuate boundaries with the second area.

FIG. 18 illustrates a front elevation view of a cutting face having a continuous first area wherein the second area occupies four portions of the cutting face.

FIG. 19 illustrates a front elevation view of a cutting face having a generally linear boundary between the first and second areas that coincides with the vertical centerline of the cutting face, the second area comprising a plurality of barcode-pattern etch paths.

FIG. 20 illustrates a front elevation view of a cutting face having a generally linear boundary between the first and second areas that does not coincide with the center of the cutting face, the second area comprising a plurality of barcode-pattern etch paths.

FIGS. 21 through 27 illustrate alternative orientations of the first and second areas that may be achieved at least by a laser etching process.

FIG. 21 illustrates a front elevation view of a cutting face having an alternative orientation of the first and second areas.

FIG. 22 illustrates a front elevation view of a cutting face having an alternative orientation of the first and second areas.

FIG. 23 illustrates a front elevation view of a cutting face having an alternative orientation of the first and second areas.

FIG. 24 illustrates a front elevation view of a cutting face having an alternative orientation of the first and second areas.

FIG. 25 illustrates a front elevation view of a cutting face having an alternative orientation of the first and second areas.

FIG. 26 illustrates a front elevation view of a cutting face having an alternative orientation of the first and second areas.

FIG. 27 illustrates a front elevation view of a cutting face having an alternative orientation of the first and second areas.

DETAILED DESCRIPTION

The illustrations presented herein are not meant to be actual views of any particular cutting element, structure, or device, but are merely idealized representations that are used to describe embodiments of the disclosure.

Any headings used herein should not be considered to limit the scope of embodiments of the invention as defined by the claims below and their legal equivalents. Concepts described in any specific heading are generally applicable in other sections throughout the entire specification.

A number of references are cited herein, the entire disclosures of which are incorporated herein in their entirety by this reference for all purposes. Further, none of the cited references, regardless of how characterized herein, is admitted as prior art relative to the invention of the subject matter claimed herein.

The present disclosure includes earth-boring tools having cutting elements having a cutting face with at least two portions, which may also be characterized as areas, the first portion of the cutting face having a different coefficient of sliding friction than the second portion. The portions of the cutting face may be polished or roughened to achieve the desired friction coefficient thereon. The cutting elements may include a table of superabrasive material having a cutting face and bonded to a supporting substrate along an interface opposite the cutting face. The inventors have discovered that cutting elements exhibiting such frictional characteristics can influence the direction of formation chip flow over the face of the cutting element, in addition to the size and character of the chip. The present disclosure also includes methods of forming such cutting elements. Examples of such cutting elements and methods of forming the cutting elements are disclosed in further detail below.

Figure 1:
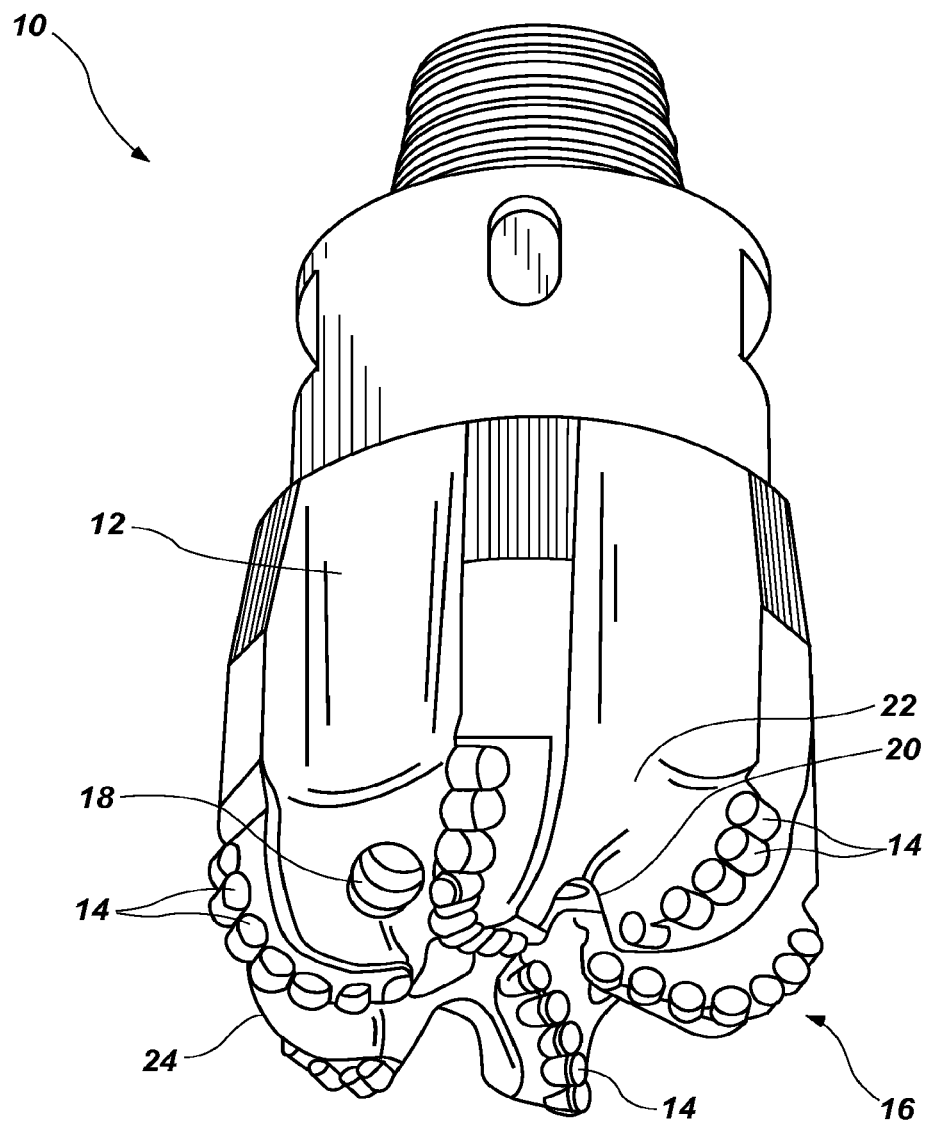
FIG. 1 is a perspective view of a typical earth-boring tool.

FIG. 1 of the drawings depicts an earth-boring tool 10, shown as being a rotary drill bit, having a body 12 secured to a shank (not shown) having a threaded pin connection thereon, whereby the earth-boring tool 10 is made up to the end of a drill string or to a down hole motor disposed at the end of a drill string (not shown). Cutting elements 14 are shown secured in a predetermined pattern and at predetermined heights and orientations on the face of a tool crown 16 to provide effective cutting for the formation type to be cut, nozzles 18 on body 12 being positioned to clear chips of formation material leaving cutting elements 14 through evacuation features of the earth-boring tool 10, including fluid courses 20 and junk slots 22. The bit body 12 may further include a plurality of blades 24 that are separated by the junk slots 22. The cutting elements 14 may be mounted on the tool crown 16 of the bit body 12 in cutting element pockets that are located along each of the blades 24. It is to be appreciated that the cutting elements, as disclosed in more detail below, may be utilized on a crown or body of any earth-boring tool, and are not limited to use on drill bits. For example, any downhole tool, such as reamers, back-up cutters, drilling-with casing tools, reaming-with casing tools, exit mills, and stabilizer pads, as non-limiting examples, may be fitted with cutting elements attached to a crown or body thereof wherein the cutting elements exhibit multiple coefficients of sliding friction capable of influencing the direction of formation chip flow over the face of the cutting element. Furthermore, cutting elements exhibiting such frictional characteristics may be used to advantage to influence the direction of chip flow of metallic cuttings, such as occurs when a downhole mill, such as a casing exit mill, is used to mill through metallic downhole components.

Figure 2:
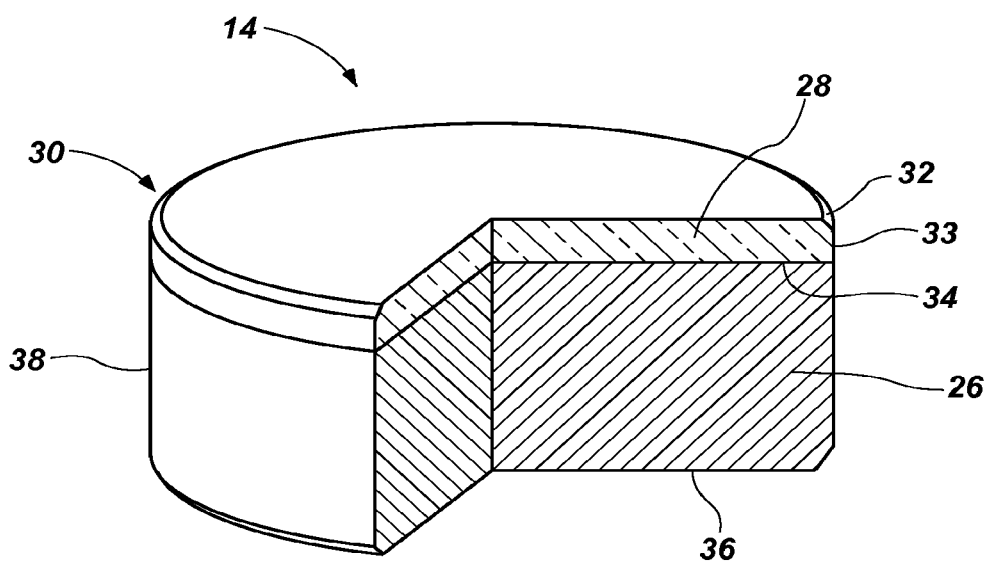
FIG. 2 illustrates a simplified perspective view of a cutting element showing a cutaway portion.
Figure 3:
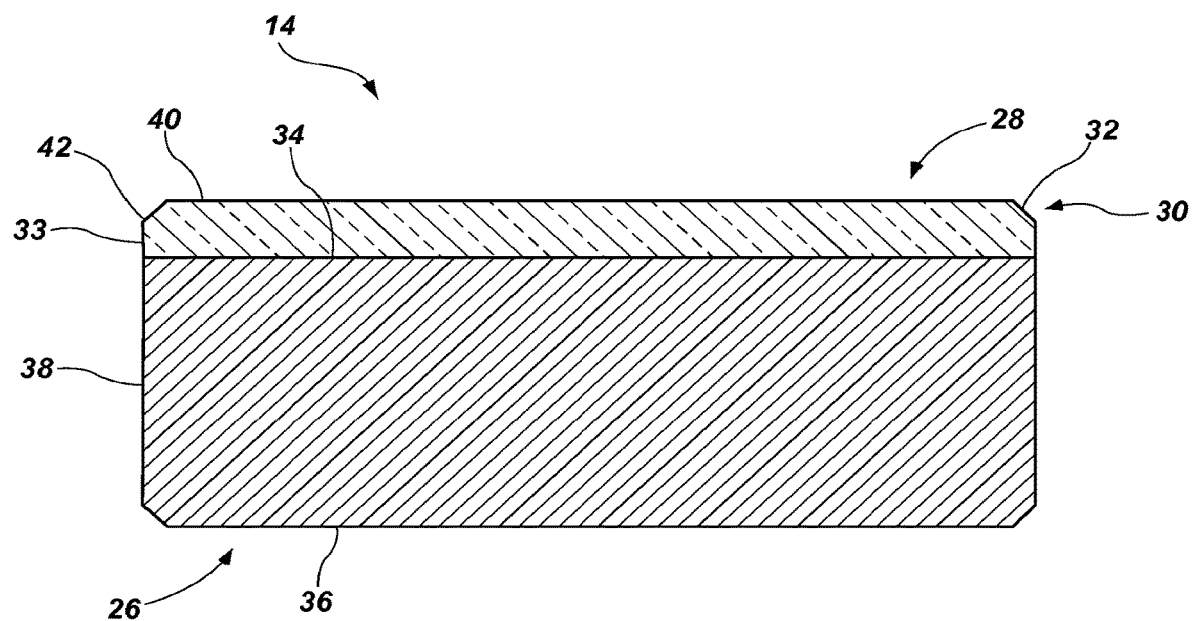
FIG. 3 illustrates a simplified cross-sectional view of a cutting element.

Referring to FIG. 2, a partially cut-away perspective view of a cutting element 14 is shown. Cutting element 14 includes a substrate 26 having a table 28 of superabrasive material (e.g., a diamond table), such as a PDC, thereon. With continued reference to FIG. 2, the diamond table 28 may be formed on the substrate 26, or the diamond table 28 and the substrate 26 may be separately formed and subsequently attached together. FIG. 3 is an enlarged cross-sectional view of the cutting element 14 shown in FIG. 2. As shown in FIG. 3, the diamond table 28 may have a chamfered edge 30. The chamfered edge 30 of the cutting element 14 has a single chamfer surface 32, although the chamfered edge 30 also may have additional chamfer surfaces, and such chamfer surfaces may be oriented at chamfer angles that differ from the chamfer angle of the chamfer surface 32, as known in the art. In lieu of chamfered edge 30, the cutting face end may be rounded, as is known to those of ordinary skill in the art. The diamond table 28 also has a side surface 33 extending from the chamfer surface 32 to the interface between the diamond table 28 and the substrate 26.

The substrate 26 may have a generally cylindrical shape, as shown in FIG. 2. Referring to FIG. 3, the substrate 26 may have an at least substantially planar first end surface 34, and an at least substantially planar second end surface 36, and a generally cylindrical lateral side surface 38 extending between the first end surface 34 and the second end surface 36.

Although the first end surface 34 shown in FIG. 3 is at least substantially planar, it is well known in the art to employ non-planar interface geometries between substrates and diamond tables attached thereto, and additional embodiments of the present disclosure may employ such non-planar interface geometries at the interface between the substrate 26 and the diamond table 28. Additionally, although substrates and their cutting elements commonly have a cylindrical shape, like that of substrate 26, other cross-sectional shapes of substrates and cutting elements are also known in the art, and embodiments of the present disclosure include cutting elements having shapes other than a generally cylindrical shape. For example, tombstone-shaped cutters and rectangular-shaped cutters, as disclosed in U.S. Pat. No. 5,881,830, issued on Mar. 16, 1999 to Cooley, the entire disclosure of which is incorporated by reference herein, in additional to elliptical-face cutters, as disclosed in United States Patent Publication No. 2009/0008155, published Jan. 8, 2009 to Sherwood, the entire disclosure of which is incorporated by reference herein, may also be used in accordance with the embodiments disclosed herein.

The substrate 26 may be formed from a material that is relatively hard and resistant to wear. For example, the substrate 26 may be formed from and include a ceramic-metal composite material (which are often referred to as "cermet" materials). The substrate 26 may include a cemented carbide material, such as a cemented tungsten carbide material, in which tungsten carbide particles are cemented together in a metallic binder material. The metallic binder material may include, for example, cobalt, nickel, iron, or alloys and mixtures thereof. Alternatively, other substrate materials may be used.

With continued reference to FIG. 3, the diamond table 28 may be disposed on or over the first end surface 34 of the cutting element substrate 26. The diamond table 28 may comprise a multi-layer diamond table 28, with various layers of differing average diamond grain size. Diamond table 28 may also comprise multiple diamond grain sizes, such as between two grain sizes and five grain sizes, by way of non-limiting example. Diamond table 28 may also comprise a multiple diamond grain size distribution, such as a monomodal, bi-modal, tri-modal, tetra-modal or penta-modal grain size distribution, by way of a non-limiting example. In a multi-layer diamond table 28, each layer may comprise a number of different average diamond grain sizes. The diamond table 28 may be primarily comprised of polycrystalline diamond material. In other words, diamond material may comprise at least about seventy percent (70%) by volume of the diamond table 28. In additional embodiments, the diamond material may comprise at least about eighty percent (80%) by volume of the diamond table 28, and in yet further embodiments, the diamond material may comprise at least about ninety percent (90%) by volume of the diamond table 28. The diamond table 28 of the cutting element 14 has a leading surface face or cutting face 40, the outermost edge of which (as the cutting element 14 is mounted on the body 12 of earth-boring tool 10) may be defined as a cutting edge 42 by which the cutting element 14 engages and cuts the formation. In conventional, unpolished PDC cutting elements, the cutting face 40 of PDC cutting element 14 is commonly lapped to a surface finish in the range of about 20 to 40 microinches (20 μin.-40 μin.) root mean square ("RMS") (all surface finishes referenced herein being RMS). A surface finish roughness in the range of 20 μin.-40 μin. is relatively smooth to the touch and visually planar (if the cutting face is itself flat), but includes a number of surface anomalies and exhibits a degree of roughness, which is readily visible to one even under very low power magnification, such as a 10 times jeweler's loupe.

Smoother surface finishes are also achievable for the cutting face 40 and chamfer surface 32 of the cutting element 14. For example, an area of the cutting face 40 may be polished to a mirror finish of 0.3 μin. By way of example and not limitation, one mode currently known to the inventors for polishing the cutting face 40 of superabrasive, such as PDC, cutting elements to obtain cutting elements having a mirror-like finish in the range of 0.3 μin.-2.0 μin. is lapping of the cutting face 40 on conventional cast iron laps known in the art using progressively smaller diamond grit suspended in a glycol, glycerine or other suitable carrier liquid. The lapping is conducted as a three-step process commencing with a 70 micron grit, progressing to a 40 micron grit and then to a grit of about 1-3 microns in size. In contrast, standard lapping techniques for a conventional, unpolished PDC cutting element having a surface finish roughness on the order of 20 μin.-40 μin. may include an initial electro-discharge grinding of the cutting face and a finish lap in one step with 70 micron grit. By way of comparison of grit size, 70 micron grit is of the consistency of fine sand or crystalline material, while 1-3 micron grit is similar in consistency to powdered sugar.

However, it has also been established that the normal 20 μin.-40 μin. surface roughness, averaging 30 μin., of state-of-the-art PDC cutting elements may be smoothed to a finish of 0.3 μm. in a one-step process. The cutting elements 14, as received from the manufacturer, are placed with their cutting faces 40 against a dry, rotating diamond wheel, as disclosed in U.S. Pat. No. 6,145,608 to Lund et al., which disclosure is incorporated by reference in its entirety herein. It may be preferred that the finish of at least a portion of the cutting faces 40 be smoothed to a 0.3 μin. or less surface finish roughness approaching a true "mirror" finish. The same methodology for polishing cutting faces may be applied to polish a chamfer surface 32 at the cutting edge 42 of the cutting face 40, as well as the side of the superhard table to the rear of the chamfer. To polish such surfaces, the cutting elements, held by their substrates, are disposed at the desired angle to the rotating wheel. The cutting elements are themselves rotated about their axis of symmetry to smooth and polish the desired chamfer and side areas of the superhard table. Other methods of polishing the cutting face 40 may also be used, including the use of belt polishers.

Figure 4:
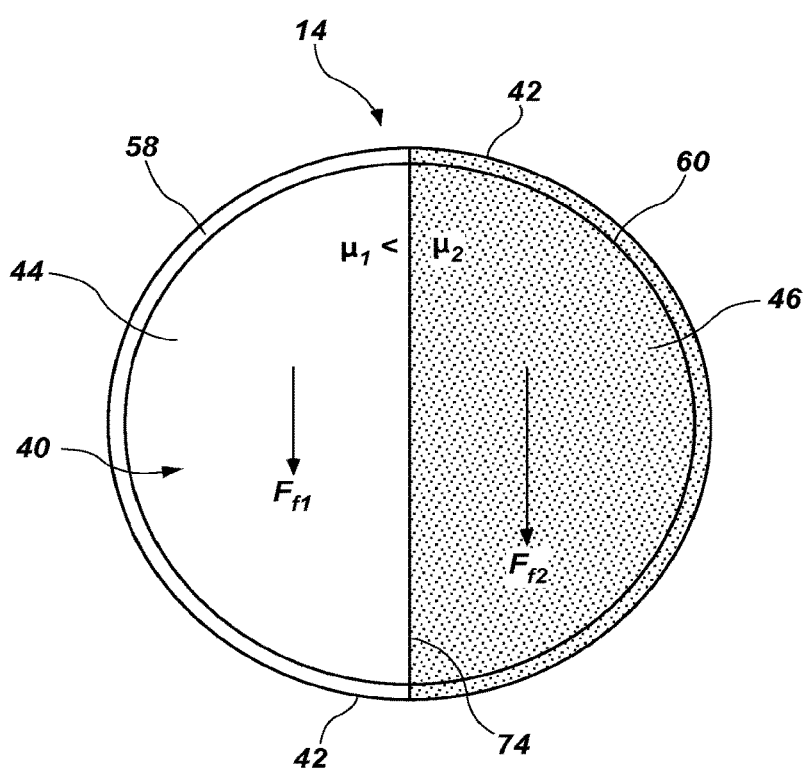
FIG. 4 illustrates a simplified front view of a cutting element similar to the cutting element of FIG. 3 having a polished surface and an unpolished surface.
Figure 5:
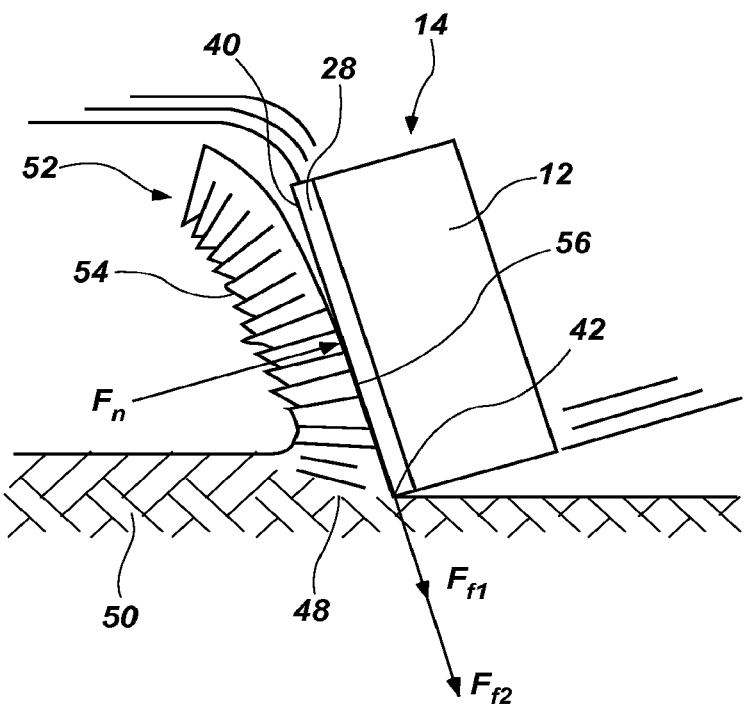
FIG. 5 illustrates a side elevation of the cutting element as the cutting element engages and cuts a subterranean formation and a formation chip is cut and slides over the cutting face of the cutting element.
Figure 6:
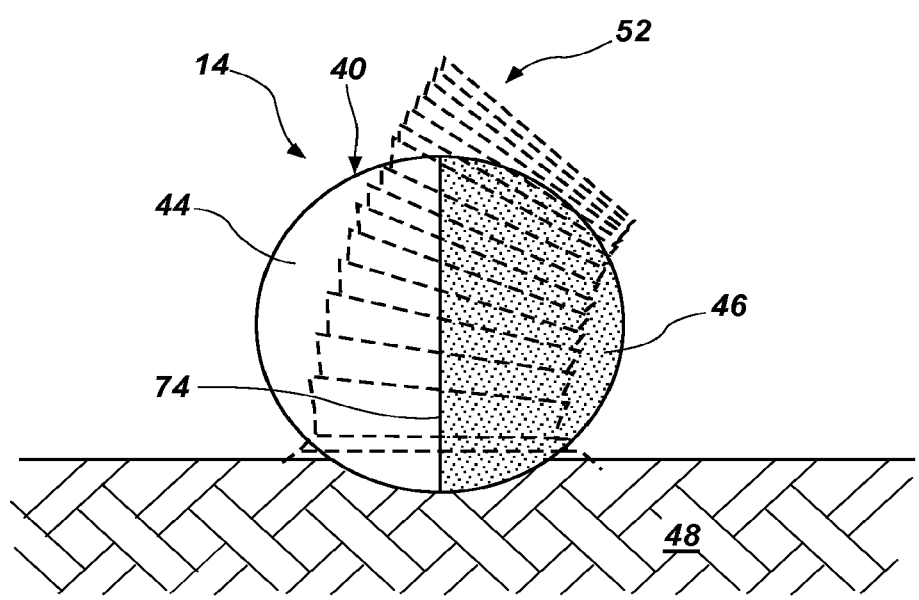
FIG. 6 illustrates a front elevation of the cutting element of FIG. 5 showing the formation chip being urged toward a portion of the cutting face having a higher coefficient of sliding friction.

As shown in FIG. 4, a cutting element 14 may be formed having a cutting face 40 with a first area 44 possessing a coefficient of sliding friction, $\mu_1$, less than a coefficient of sliding friction, $\mu_2$, possessed by a second area 46 of the cutting face 40. The relative difference between $\mu_1$ and $\mu_2$ causes the portion of the formation chip sliding over the second area 46 to encounter a greater friction force, $F_{f2}$, than the friction force, $F_{f1}$, encountered by the portion of the chip sliding over the first area 44. The relationship between the friction force exerted on the chip and the coefficient of friction of the cutting face 40 may be expressed in the following equation:

$$F_f = \mu F_n,$$

where $F_f$ is the friction force exerted on the chip, $\mu$ is the coefficient of sliding friction of the surface of the cutting face, and $F_n$ is the normal force exerted on the cutting face 40 by the chip. FIG. 5 depicts a cutting element 14 engaging and cutting a subterranean formation 48. As illustrated, the cutting edge 42 of the cutting element 14 is substantially fully engaged with the pristine or previously uncut and undisturbed area 50 of subterranean formation 48. Failure of the formation material occurs immediately adjacent, and forward of, the cutting edge 42. Thus, the cutting edge 42 is able to cut or shear a formation chip 52 from the subterranean formation 48 in a substantially unimpeded manner. As shown, the formation chip 52, of substantially uniform thickness, moves relatively freely from the point of contact or line of contact with the subterranean formation 48 from the cutting edge 42 upwardly along the cutting face 40. As the cutting edge 42 engages the subterranean formation 48, a pressure differential is created between an outer or leading side 54 of the formation chip 52 (the side away from the cutting face 40) and an inner side 56 of the formation chip 52 immediately abutting the cutting face 40. This pressure differential, in addition to the reactive force of the subterranean formation 48 (and the formation chip 52) pressing back against the cutting face 40, results in the normal force, $F_n$, of the formation chip 52 against the cutting face 40. Thus, referring to FIGS. 4 and 5, the relationship between the coefficient of sliding friction of the first area 44 and the second area 46 and the friction force exerted on the chip by the first area 44 and the second area 46 may be expressed, respectively, by the following equations:

$$F_{f1} = \mu_1 F_n, \text{ and}$$

$$F_{f2} = \mu_2 F_n,$$

where $F_{f1}$ is the friction force exerted on the portion of the chip sliding over the first area 44 of the cutting face 40, $F_{f2}$ is the friction force exerted on the portion of the chip sliding over the second area 46 of the cutting face 40, $\mu_1$ is the coefficient of sliding friction of the first area 44, $\mu_2$ is the coefficient of sliding friction of the second area 46, and $F_n$ is the normal force that the chip exerts on the cutting face 40. The force, $F_{f1}$, encountered by the portion of the chip sliding over the first area 44 resists the motion of the chip as it slides up the cutting face, in essence "braking" movement of the portion of the chip sliding over the first area 44. However, the force, $F_{f2}$, encountered by the portion of the chip sliding over the second area 46 resists the movement of that portion of the chip to a greater extent than the first area 44 resists the movement of the portion sliding over the first area 44, in essence "braking" harder on the portion of the chip sliding over the second area 46. This differential in the friction forces, $F_{f1}$ and $F_{f2}$, exerted on the different portions of the formation chip 52 results in a bending moment exerted on the chip, effectively pulling the leading end and body of the formation chip 52 in the direction of the second area 46 as it slides up the cutting face 40. Thus, the formation chip 52 is urged or steered toward the second area 46 and away from the center of the cutting face 40, as illustrated in FIG. 6. In this manner, the formation chip 52 flow may be steered in a predetermined direction by the relative locations of the first area 44 and the second area 46 on the cutting face 40 of the cutting element 14. Accordingly, the formation chip 52 flow may be directed favorably into the path of drilling fluid exiting the nozzles 18 (FIG. 1), toward a specific fluid course or junk slot, toward the outer diameter, also termed the "gage," of the earth-boring tool 10, or in any other manner to improve the performance of the earth-boring tool 10. Tests have also indicated other favorable behaviors of the formation chip 52 as it is sheared from the subterranean formation 48 by a multi-friction cutting element 14. For example, in addition to being urged toward the second area 46 of the cutting face 40, the formation chip 52 also exhibits a twisting behavior, which may assist in breaking the formation chip 52 into smaller pieces, increasing the ease with which the formation chip 52 is urged laterally away from the center of the cutting face 40 and off the multi-friction cutting element 14 and further increasing the efficiency in which the formation cuttings are transported by the drilling fluid up the annulus of the wellbore.

Referring again to FIG. 4, one method of providing a coefficient of sliding friction on the first area 44 less than the coefficient of sliding friction on the second area 46 is to provide the first area 44 with a surface finish roughness less than the surface finish roughness of the second area 46. For example, the first area 44 of the cutting face 40 may be polished to a surface finish roughness of about 0.3 µin, while the second area 46 may have a standard surface finish roughness for PDC cutting elements of about 20 µin.-40 µin. When the first area 44 has a polished surface finish roughness in the range 0.3 µin.-2.0 µin. and the second area 46 has a surface finish roughness greater than the surface finish roughness of the first area 44, the differential in the relative coefficients of friction, $\mu_1$ and $\mu_2$, of the first area 44 and the second area 46 described above may be achieved. Other non-limiting examples of the relative surface finishes of the first area 44 and the second area 46 are now provided. The first area 44 may be polished to a surface finish roughness of about 2.0 µin. while the second area 46 may have a surface finish roughness of about 20-40 µin. Alternatively, the first area 44 may be polished to a surface finish roughness of about 0.3 µin. while the second area 46 may have a surface finish roughness of about 2.0 µin. The degree of difference between the surface finish roughness of first area 44 and that of second area 46 may be selected to alter the bending moment applied to a formation chip 52 moving over the cutting face 40, and thus the directionality of the chip's movement. Accordingly, different surface finish combinations may be employed for cutting elements 14 at different locations on the tool face, to provide preferred steering of chips at the various locations. It is to be appreciated that providing the first area 44 with a coefficient of sliding friction different than a coefficient of sliding friction of the second area 46, as described above, may also be utilized to advantage with alternative types of cutting elements. For example, cutting element 14 may alternatively be a carbide-covered PDC cutting element. In yet other embodiments, the cutting element 14 may have a carbide table or a ceramic table, instead of a diamond table, bonded to the substrate. Additionally, yet other various types of cutting elements may utilize the embodiments disclosed herein to advantage, and the present disclosure is not limited only to the types of cutting elements expressly described herein.

The cutting element 14 of FIG. 4 may also have a first chamfer surface 58 at a periphery of the first area 44 of the cutting face 40 and a second chamfer surface 60 at a periphery of the second area 46 of the cutting face 40. The first chamfer surface 58 may be polished to have substantially the same surface finish roughness as the first area 44, and the second chamfer surface 60 may be formed to have substantially the same surface finish roughness as the second area 46. Additionally, portions of the side surface 33 (FIG. 3) of the cutting element 14 may be polished to any of the surface finish roughnesses described above.

It is also within the scope of the embodiments disclosed herein to polish the cutting surfaces (cutting face 40, chamfer surfaces 32, 58, 60, side surface 33, etc.) by other means, such as ion beams or chemicals, although the inherently inert chemical nature of diamond makes the latter approach somewhat difficult for diamond.

It is to be appreciated that other methods may be used to provide the differing coefficients of friction on the first area 44 and the second area 46 of the cutting face 40, including providing different material compositions on or within the diamond table 28 including, without limitation, the use of different diamond grain sizes over different areas of the cutting face 40. It is also contemplated that surface roughness differences may be effected by selective deposition of a diamond film over an area of a cutting face 40, chamfer surfaces 32, 58, 60, side surface 33, etc., using chemical vapor deposition (CVD) techniques including, for example, plasma-enhanced CVD (PECVD) by masking an area or areas over which the diamond film is not to be deposited.

Figure 7:
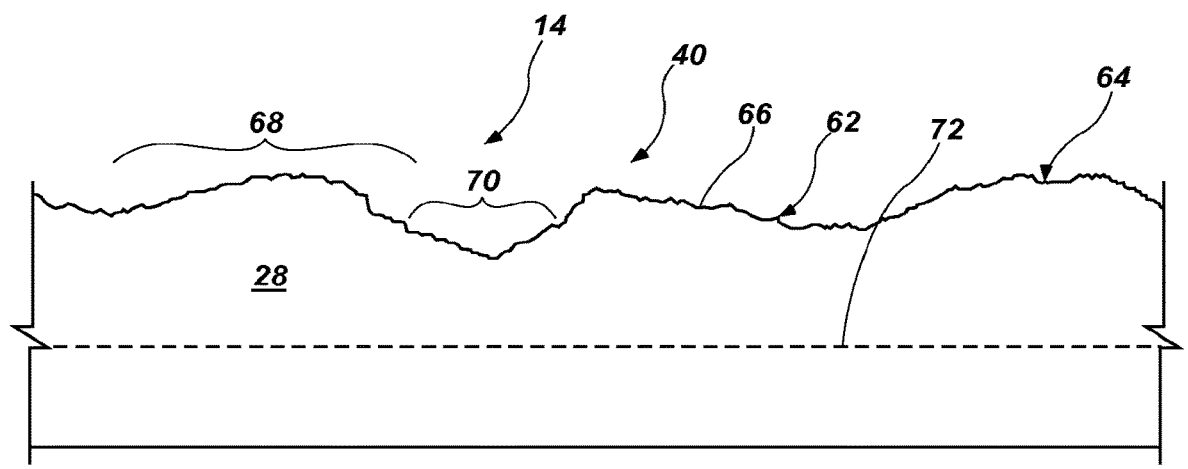
FIG. 7 illustrates an example of a surface finish profile of an unpolished cutting face of a cutting element.
Figure 8:
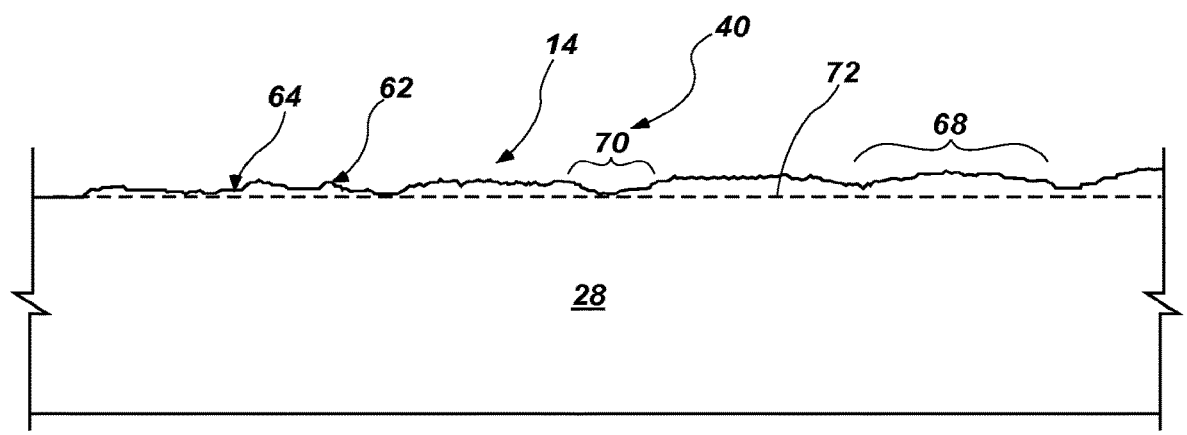
FIG. 8 illustrates an example of a surface finish profile of a polished cutting face of a cutting element.

Referring to FIGS. 7 and 8, the difference in surface topography between an area of the cutting face 40 of a polished cutting element 14 having a surface finish roughness in the range of about 0.3 µin.-2.0 µin. and that of an area of the cutting face 40 of a cutting element 14 having a surface finish roughness in the range of about 20 µin.-40 µin. will be readily appreciated. FIGS. 7 and 8 comprise renderings as if portions of a diamond or other superabrasive table were sectioned perpendicular to the cutting face, and not tracings of actual photomicrographs. In FIG. 7, an area of a cutting face 40 of a diamond table 28 having a surface finish roughness in the range of about 20 µin.-40 µin. is shown to contain microscopic "peaks" 62 and "valleys" 64 in the surface 66. Such minute elements may always be present, as well as large "ranges" or "waves" 68 and "canyons" or "troughs" 70, which comprise the major topographic features or perturbations on cutting face 40. It is these ranges or waves 68 and canyons or troughs 70 and not the much smaller microscopic peaks 62 and valleys 64 in surface 66 which provide or result in the 20 µin.-40 µin. surface roughness of the cutting face 40. FIG. 8, on the other hand, depicts how such ranges or waves 68 are of markedly reduced height and canyons or troughs 70 of markedly reduced depth in a cutting face area having a surface roughness in the range of 0.3 µin.-2.0 µin. Broken lines 72 provide a reference baseline within each area of diamond table 28 from which to view the relative surface roughness of the cutting face areas of cutting element 14. Thus, in microscopic terms, the surface smoothing, which takes place in producing a cutting element with a mirror surface finish area effects a modification and reduction of relatively large-scale features of the surface topography, and not an elimination of individual inclusions in and protrusions from the surface itself. Of course, some significant reduction in potential nucleation sites or flaw sites is achieved, as previously noted. Furthermore, one could smooth and polish a curved, ridged, waved, or other cutting nonlinear face area in accordance with the methods discussed above to remove and reduce both large and small asperities, resulting in a mirror finish cutting face area, which nonetheless is not flat in the absolute sense.

Tests have indicated that, in addition to relative reduction in normal and tangential loading experienced using polished cutting faces versus lapped cutting faces, there is also a marked difference in the appearance of the formation chips and kerf (trough left by the cutting element). Chips cut by the polished cutting face PDC cutting element were of substantially uniform thickness and substantially continuous appearance. The kerf cut by the polished cutting element was very smooth, almost machined in uniformity, while the kerf cut by the standard lapped cutting element possessed an irregular profile and bottom surface.

To quantify the results achievable by a polished cutting face 40, when a PDC cutting element is polished to 0.3 µin. mirror surface finish roughness, calculations based upon force data show the coefficient of sliding friction to be reduced to about half, or fifty percent, of that of a 20 µin.-40 µin. standard finished, but otherwise identical, PDC cutting element. Thus, it can be said that reducing sliding contact stresses between the cutting face and formation chip can be defined macroscopically as achieving a low friction PDC, diamond or other superhard material table. Such a reduction in coefficient of sliding friction may be employed, beneficially, in embodiments of the present disclosure to effect preferential formation chip steering, as described above. Furthermore, cutting elements 14 exhibiting multiple frictional characteristics, as described above, may advantageously affect the power requirements related to operating a downhole tool fitted with such cutting elements 14.

While the present embodiments have been described with reference to individual cutting elements mounted at separate locations on a tool face, it is contemplated that the present embodiments have equal utility with blade-type tools wherein very large, substantially continuous cutting faces are presented to engage the formation. Such cutting faces may be fabricated from adjacent round, square or otherwise shaped individual cutting elements of the same or different material, closely spaced and with cooperative or even interlocking borders. The individual cutting elements may have different cutting face roughnesses, and be assembled into a larger mosaic cutting face having areas of different coefficients of friction. Convex, concave or other arcuately surfaced cutting elements may be polished, as may the alternate geometry (stepped, ridged, waved, etc.) cutting element surfaces.

FIGS. 9 through 12 are front elevation views illustrating examples of different orientations of the first area 44 and the second area 46 of the cutting face to urge the formation chip 52 in predetermined directions (indicated by the arrow) as it slides up the cutting face of the cutting element 14.

Figure 9:
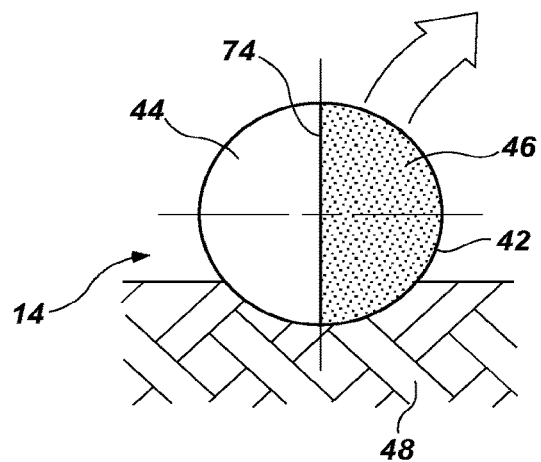
FIGS. 9 through 11 and 13 through 27 illustrate different orientations of the cutting face.

FIG. 9 is a front elevation view of the cutting element 14 engaging a subterranean formation 48. In this example orientation, the first area 44 and the second area 46 have a linear boundary 74 coincident with the center of the cutting face and substantially perpendicular to the tool crown 16 (not shown) at the point of attachment of the cutting element 14 to the tool crown 16. As illustrated in FIG. 6, in such an orientation, the higher friction force encountered by the portion of the formation chip 52 on the second area 46 in comparison to the first area 44 urges the formation chip 52 laterally away from the center of the cutting face toward the second area 46 (as indicated by the direction of the arrow) as the formation chip 52 slides over the cutting face.

Figure 10:
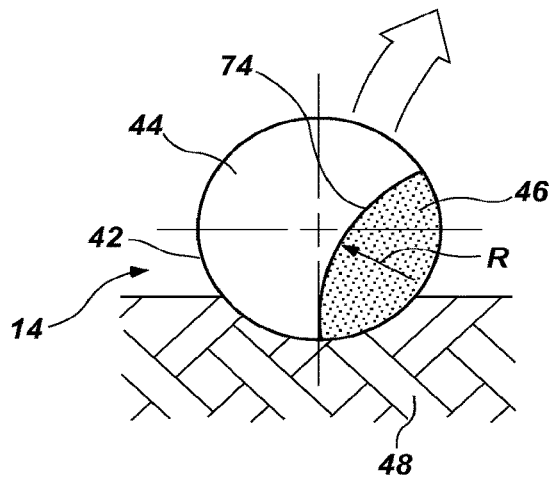

FIG. 10 illustrates an orientation of the first area 44 and the second area 46 of the cutting face having a non-linear boundary 74 therebetween. As in FIG. 9, the linear boundary 74 between the first area 44 and the second area 46 extends from a location on the cutting face proximate a profile of the tool crown 16 at the point of attachment of the cutting element 14 to the tool crown 16 to an area remote from the profile of the tool crown 16. However, as shown in FIG. 10, the linear boundary 74 between the first area 44 and the second area 46 follows an arcuate path from a point along the centerline of the face proximate the profile of the tool crown 16 (not shown) and arcs toward a lateral side of the cutting face remote from the profile of the tool crown 16, imparting a greater surface area to the second area 46 in relation to the first area 44. However, in other embodiments, the cutting face may have an arcuate boundary 74 between the first area 44 and the second area 46 oriented in a manner to impart the second area 46 with a greater surface area than the first area 44.

Figure 11:
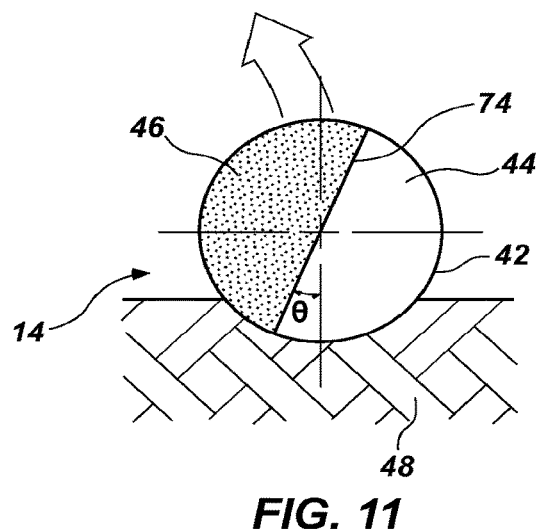

FIG. 11 illustrates an orientation of the first area 44 and the second area 46 of the cutting face having a linear boundary 74 coincident with the center of the cutting face and slanted at an acute angle θ with respect to the centerline of the cutting face perpendicular to the tool crown 16 (not shown) at the point of attachment of the cutting element 14 to the tool crown 16. As the cutting edge 42 of the cutting element 14 engages the subterranean formation 48, a formation chip 52 begins to form at the cutting edge 42. As the cutting edge 42 commences shearing the formation chip 52 from the subterranean formation 48, a majority portion of the formation chip 52 in FIG. 11 is initially in sliding contact with the first area 44 of the cutting face and a minority portion of the formation chip 52 is in contact with the second area 46 of the cutting face, resulting in only the minority portion of the formation chip 52 being "pulled" laterally by the higher friction force exerted on the formation chip 52 by the second area 46 in comparison to the first area 44. However, as the formation chip 52 is progressively sheared from the subterranean formation 48 and slides further up the surface of the cutting face, an increasingly greater portion of the formation chip 52 comes into contact with the second area 46 while an increasingly lesser portion of the formation chip 52 remains in contact with the first area 44, resulting in an increasingly greater portion of the formation chip 52 being "pulled" laterally toward the second area 46 by the higher friction force exerted by the second area 46 in comparison to the first area 44. The angle θ may be in the range of 0°-60°. The effect of the angle θ of slant of the boundary between the first area 44 and the second area 46 is such that as the angle θ increases, the extent to which the formation chip 52 is urged laterally away from the center of the cutting face decreases. If the angle θ were set at more than 60°, the steering effect would be negated and the interface between the first area 44 and the second area 46 may act more as a "chip-breaker."

Figure 12:
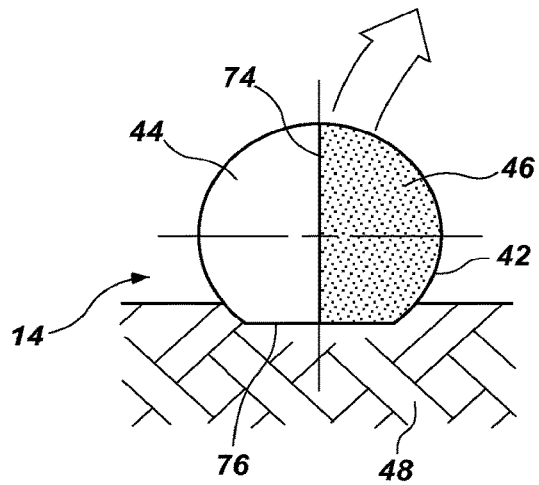
FIG. 12 illustrates the cutting element of FIG. 9 having a wear-flat worn into the cutting element.

As shown in FIG. 12, as the cutting element 14 progressively engages the formation, a wear-flat 76 forms at the cutting edge 42 of the cutting element 14. The presence of the wear-flat 76 does not eliminate the ability of the cutting element 14 to steer the formation chip 52 laterally away from the center of the cutting element 14. FIG. 12 depicts the cutting element 14 being oriented similarly to the cutting element illustrated in FIG. 9. In orientations wherein the boundary 74 between the first area 44 and the second area 46 of the cutting face is linear and coincident with the center of the cutting face and substantially perpendicular to the tool crown 16 (not shown) at the point of attachment of the cutting element 14 to the tool crown 16, the wear-flat 76 formation does not affect the radius of curvature of movement of the formation chip 52 (indicated by the direction of the arrow) as the formation chip 52 is urged toward the second area 46 and laterally away from the center of the cutting face; however, the wear-flat 76 decreases the amount of vertical surface area of the cutting face upon which the chip slides across, thus the wear-flat 76 affects the surface area of the portion of the cutting face from which the formation chip 52 exits as it slides off the cutting face. As the size of the wear-flat 76 increases, the lateral extend to which the formation chip 52 is urged from the center of the cutting face decreases. It is to be appreciated that the arrows indicating the direction of chip flow off of the cutting face are representative only and are not meant to depict the exact direction of chip flow.

Figure 13:
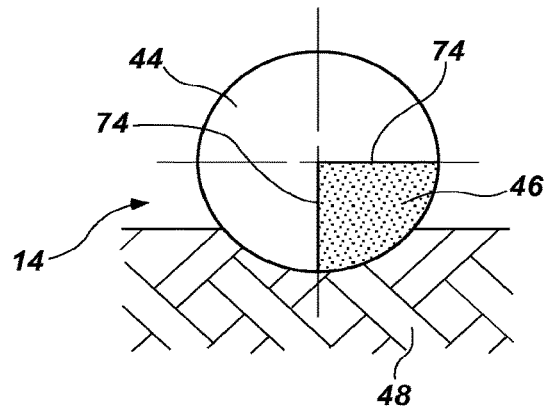

FIG. 13 illustrates an orientation of the first area 44 and the second area 46 wherein the second area 46 occupies one quadrant of the cutting face and the first area 44 occupies the remaining area of the cutting face. FIG. 13 depicts a linear boundary line 74 being aligned with the vertical centerline of the cutting face, although in other embodiments the quadrant may be aligned at an angle with respect to the vertical centerline of the cutting face.

Figure 14:
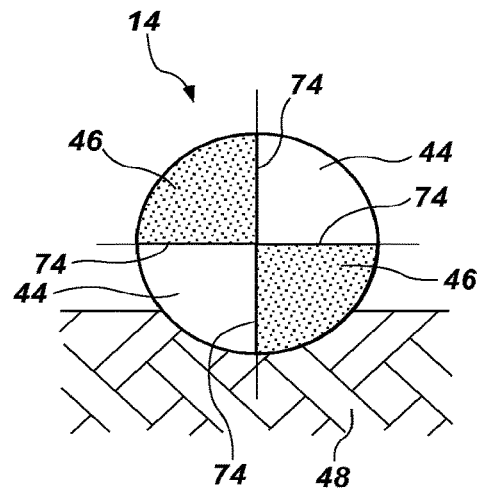

FIG. 14 illustrates an orientation of the first area 44 and the second area 46 wherein each of the first area 44 and the second area 46 occupy two non-consecutive quadrants of the cutting face. One or more boundary lines 74 are depicted as being aligned with the vertical centerline of the cutting face, however, in other embodiments the quadrants may be aligned at an angle with respect to the vertical centerline of the cutting face.

Figure 15:
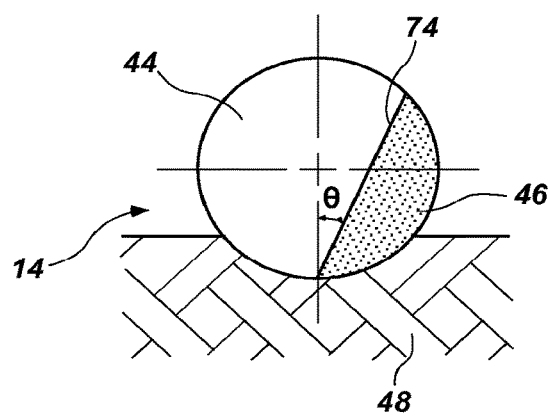

FIG. 15 illustrates an orientation of the first area 44 and the second area 46 having a linear boundary 74 therebetween, the linear boundary 74 extending from an edge of the cutting face at a point coincident with the vertical centerline of the cutting face to an edge of the cutting face at an angle θ with respect to the vertical centerline of the cutting face. The angle θ may be in the range of about 0°-60°. Alternatively, the linear boundary 74 at an edge of the cutting face need not be coincident with the vertical centerline of the cutting face.

Figure 16:
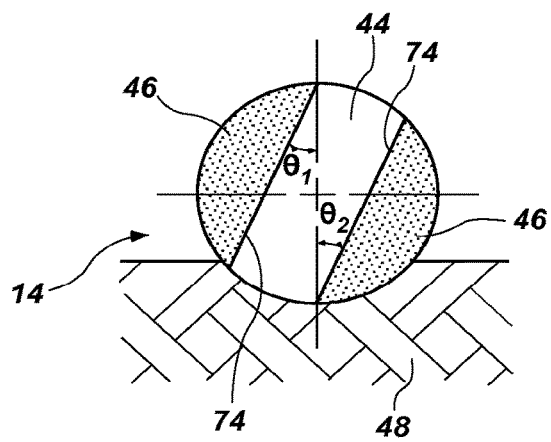

FIG. 16 illustrates a cutting element 14, similar to the cutting element of FIG. 15, wherein the second area 46 occupies two separate portions on opposite sides of the first area 44, there being two linear boundaries 74 therebetween. Each linear boundary 74 extends from a substantially opposite edge of the cutting face at a point coincident with the vertical centerline of the cutting face, and extends at an angle, θ1 and θ2, respectively, with respect to the vertical centerline. The angles θ1 and θ2 may each be in the range of about 0°-60°. FIG. 16 depicts the linear boundaries 74 being parallel, although, in additional embodiments, the linear boundaries 74 may be non-parallel. Furthermore, in other embodiments, one or both of the linear boundaries 74 need not be coincident with the vertical centerline of the cutting face.

Figure 17:
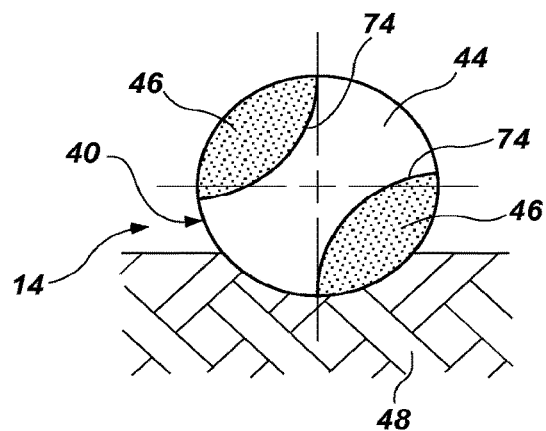

FIG. 17 illustrates a cutting element, similar to the cutting element of FIG. 10, wherein the second area 46 occupies two separate, symmetrical portions on opposite sides of the first area 44, there being two arcuate boundaries 74 therebetween. In other embodiments, the two portions of the second area 46 are not required to be symmetrical.

Figure 18:
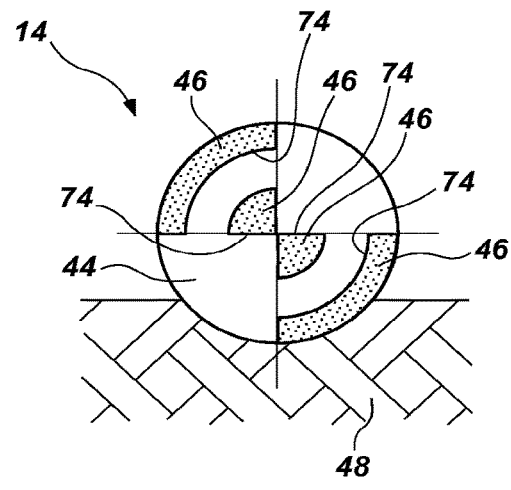

FIG. 18 illustrates an additional orientation of the first area 44 and the second area 46 in a partially ringed, quadrant pattern.

Figure 19:
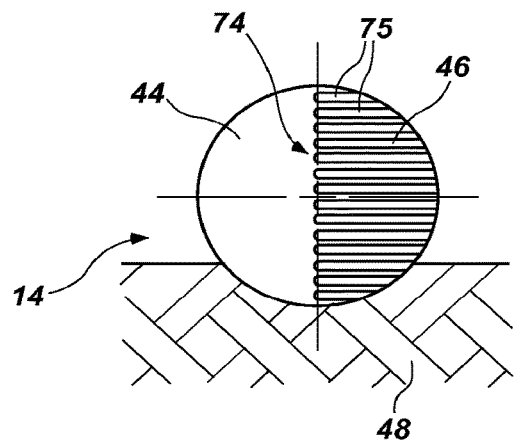

FIG. 19 illustrates an orientation of the first area 44 and the second area of the cutting face similar to FIG. 9, wherein the second area 46 comprises a multiplicity of barcode-pattern etch paths 75. The etch paths 75 may be formed using a laser etching process to "roughen" portions of a polished cutting face, as will be disclosed in more detail below. One or more lasers may be positioned and controlled in a manner analogous to standardized computer numerical control (CNC) machining processes. The one or more lasers may be configured to emit a beam of electromagnetic radiation at any wavelength that will be at least partially absorbed by the cutting face of the diamond table in a manner to roughen the second area 46 of the cutting face along the etch paths 75. Additionally, one or more gas jets may be provided to enhance the roughening of the second area 46 of the cutting face 40 by the one or more lasers. The laser etching process is more fully disclosed in U.S. patent application Ser. No. 12/265,462, which published as U.S. Patent Publication No. 2009/0114628, which application is incorporated by reference herein in its entirety.

Figure 20:
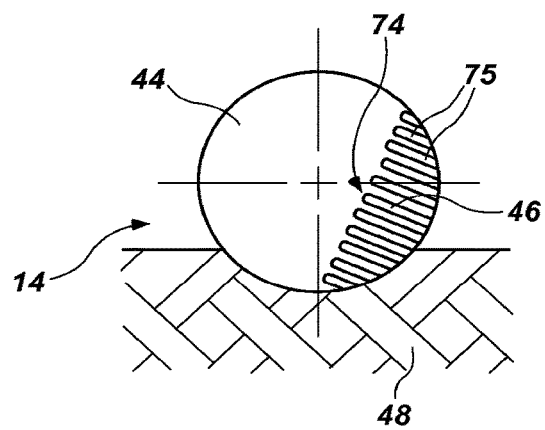
Figure 21:
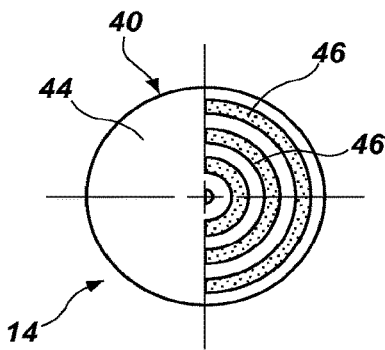
Figure 22:
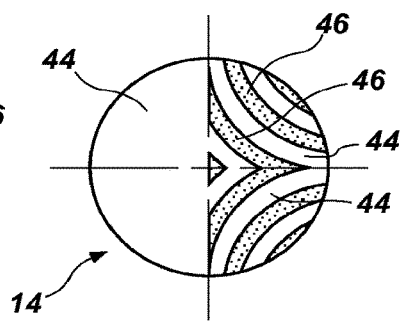
Figure 23:
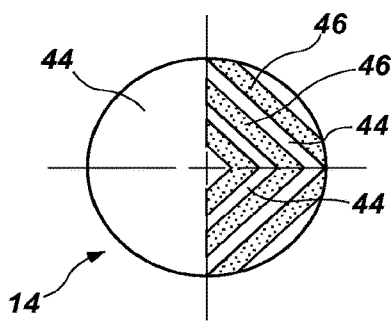
Figure 24:
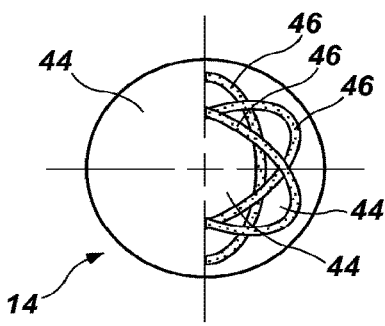
Figure 25:
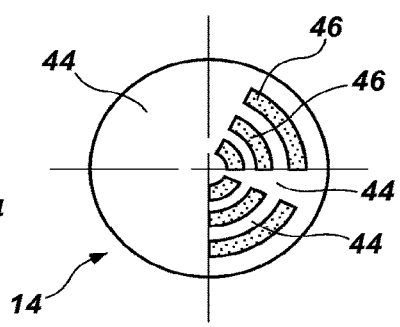
Figure 26:
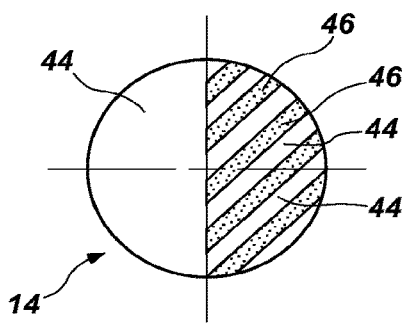

FIG. 20 illustrates an orientation of the first area 44 and the second area 46 similar to FIG. 15, wherein the second area 46 comprises a multiplicity of barcode-pattern etch paths 75. The etch paths 75 depicted in FIG. 20 may be formed by the laser etching process discussed previously.

It is to be appreciated that, while FIGS. 9 through 20 illustrate various orientations of the first area 44 and the second area 46 on the cutting face, other orientations are within the scope of the embodiments disclosed herein.

Figure 27:
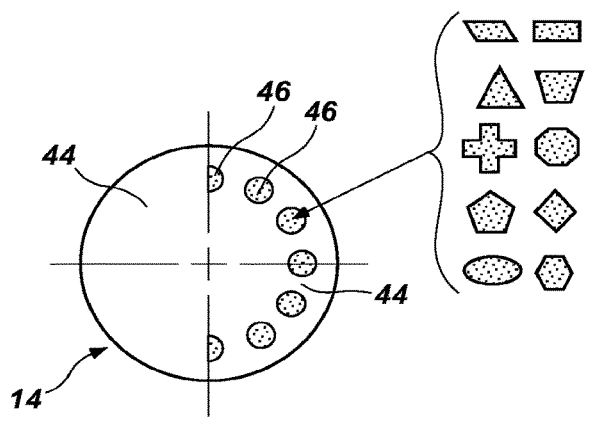

FIGS. 21 through 27 illustrate various alternative orientations within the scope of the present disclosure. It is to be appreciated that the shapes and/or orientations of the first area 44 and second area 46 may be reflectively symmetric or reflectively asymmetric about at least two planes defined by x, y, and z axes of a Cartesian coordinate system defined to align a z axis of the coordinate system with a central axis of the cutting element 14 and to locate the center of the coordinate system the center of the cutting face 40. Referring to FIG. 27, the second area 46 may include a symmetrical pattern of spaced-apart circular regions. The circular regions are one example of shapes that may be used in such an orientation, while other shapes may also be used.

Figure 28:
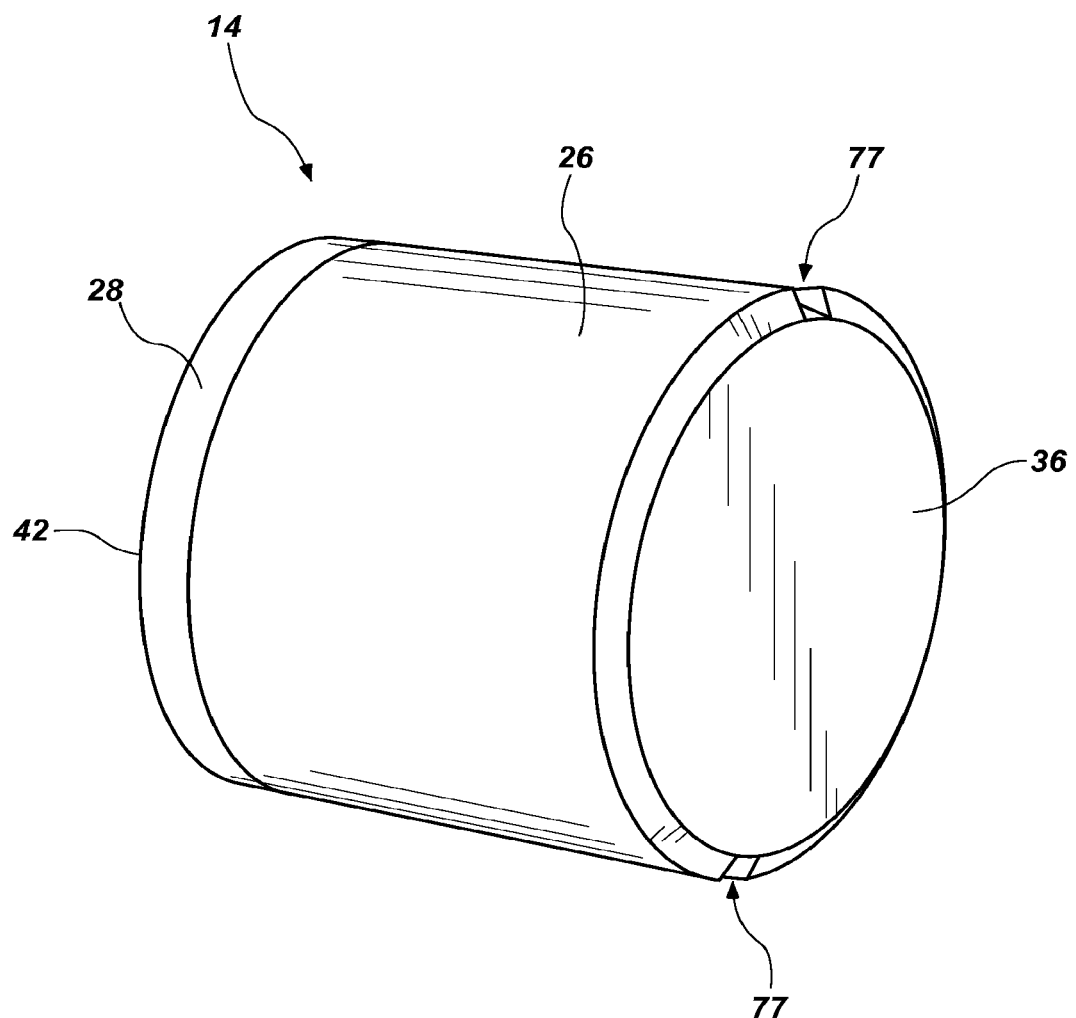
FIG. 28 illustrates a perspective view of a cutting element having one or more marks on a rear surface of a substrate of the cutting element.

FIG. 28 illustrates a perspective view of a multi-friction cutting element 14 having a substrate 26 bonded to a diamond table 28, the diamond table having a cutting edge 42. The second end surface 36 of the substrate 26 is shown having one or more marks 77 formed on the substrate 26 proximate the second end surface 36 in a manner to aid the process of orienting the cutting element when attaching the cutting element 14 to the tool crown. The marks 77 may be painted, etched, or otherwise formed on the substrate 26.

FIGS. 29 through 37 illustrate examples of methods that may be used to form an earth-boring tool having a plurality of cutting elements attached to the tool crown, wherein at least one of the cutting elements is a multi-friction cutting element.

FIGS. 29 through 32 illustrate examples of forming a multi-friction cutting element 14 from a single existing cutting element.

Figure 29:
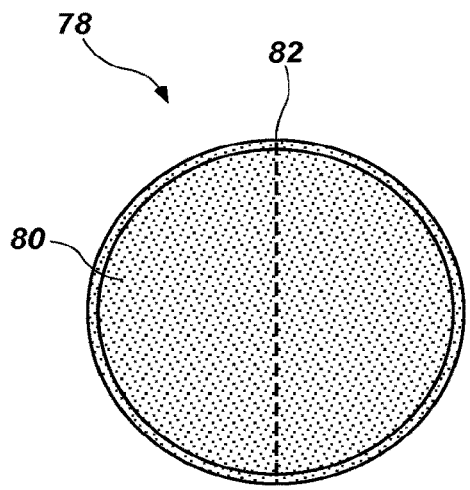
FIG. 29 illustrates a front view of an unpolished cutting element prior to being formed into a multi-friction cutting element.
Figure 30:
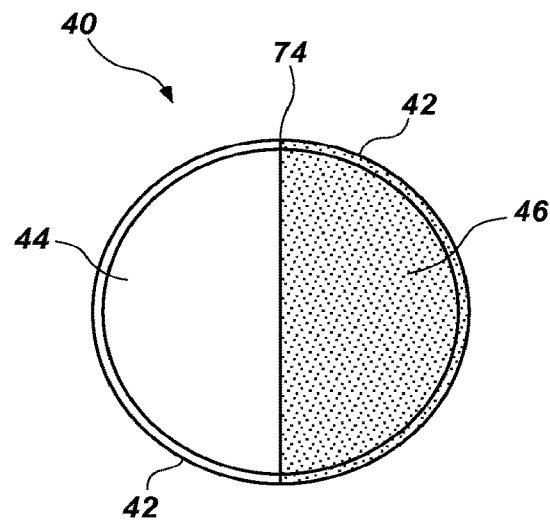
FIG. 30 illustrates a front view of the cutting element of FIG. 29 having an area of the cutting face polished and a second area remaining unpolished.

The multi-friction cutting face 40, as described above, may be formed by polishing a portion of an unpolished cutting element. FIG. 29 illustrates a front view of a cutting element 78, similar to the cutting element 14 of FIGS. 2 and 3, and may be formed as previously described herein. The cutting element 78 may have an unpolished cutting face 80, which may or may not have been previously lapped. A portion of the cutting face 80 on one side of a boundary line 82 may be polished to form a first area 44 with one substantially constant surface finish roughness that is less rough than the remaining unpolished area, which forms the second area 46 and having another substantially constant surface finish roughness different from the surface finish roughness of the first area 44, as shown in FIG. 30. The first area 44 may be polished to a surface finish roughness, for example, in the range of about 0.1 µin.-2.0 µin. while the second area 46 may have a surface finish roughness in the range of about 10 µin.-400 µin. In yet other embodiments, the entire cutting face 80 may be polished to a surface finish roughness less than 20 µin. prior to forming the first area 44, and the first area 44 may subsequently be formed by polishing a portion of the cutting face 80 on one side of the boundary line 82 to a surface finish roughness less than that of the remaining portion of the cutting face 80 that forms the second area 46. It is to be appreciated that the boundary line 82 depicted in FIG. 29 is not required to be a centerline of the cutting face 80. Moreover, the boundary line 82 is not required to be straight, although a straight boundary line 82 causes less difficulty in forming the first area 44 and the second area 46 of the cutting face.

Figure 31:
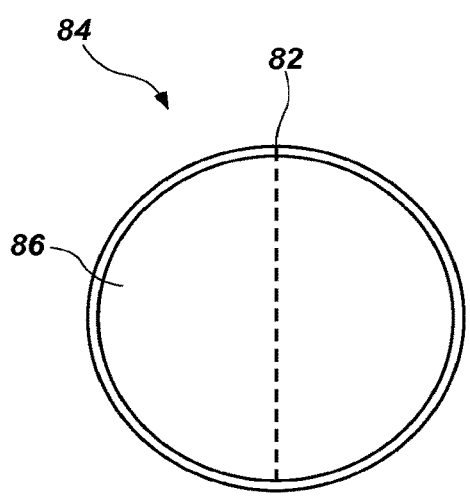
FIG. 31 illustrates a front view of a polished cutting element prior to being formed into a multi-friction cutting element.
Figure 32:
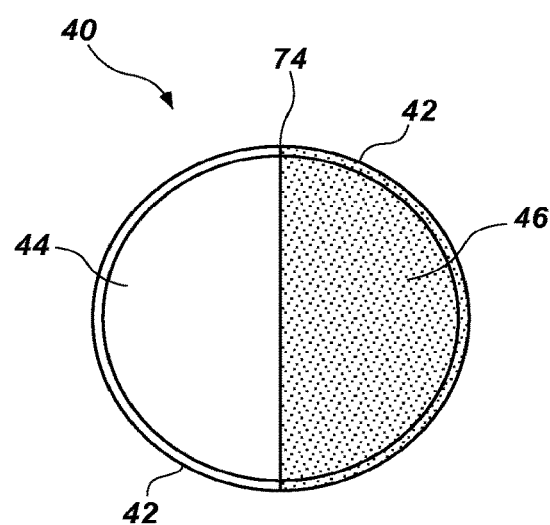
FIG. 32 illustrates a front view of the cutting element of FIG. 31 having a first area of the cutting face "roughened" and an area remaining polished.

Referring now to FIG. 31, the multi-friction cutting element 14 may also be formed by roughening a portion of a polished cutting face. FIG. 31 shows a front view of a cutting element 84, similar to the cutting element 14 of FIGS. 2 and 3, and which may be formed as previously described herein. The cutting element 84 may have a lapped or polished cutting face 86. The cutting face 86 may be polished to a substantially constant surface finish roughness in the range of 0.3 µin.-2.0 µin, or may be of a conventional lapped surface finish roughness in the range of about 20 µin.-40 µin. Subsequently, a portion of the cutting face 86 on one side of a boundary line 82 may be roughened to form the second area 46 possessing a substantially constant surface finish roughness greater than that of the remaining polished area, which forms the first area 44, as shown in FIG. 32. The second area 46 may be roughened by a laser etching process, as disclosed previously, a chemical etching process, a mechanical etching process, or an electrochemical etching process. Other roughening processes are also within the scope of the embodiments disclosed herein. In additional embodiments, the first area 44 may be further polished after the second area 46 is roughened. It is to be appreciated that the boundary line 82 depicted in FIG. 31 is not required to be a centerline of the cutting face 86. Moreover, the boundary line 82 is not required to be straight.

Once the multi-friction cutting element 14 is formed, it may be attached to the tool crown 16 of the earth-boring tool 10. As discussed above, the multi-friction cutting element 14 may be characterized as having a plane orthogonal to the cutting face, the cutting element 14 having a first portion on one side of the plane and a second portion on a second, opposite side of the plane. The multi-friction cutting element 14 may be attached to the tool crown 16 in a manner where a proximal end of the plane P is proximate to a profile of the tool crown 16 in the area where the cutting element 14 is attached to the tool crown 16 and a distal end of the plane P is remote from the tool crown.

FIGS. 33 through 37 illustrate examples of methods that may be used to form a multi-friction cutting element 14 from two existing cutting elements.

Figure 33:
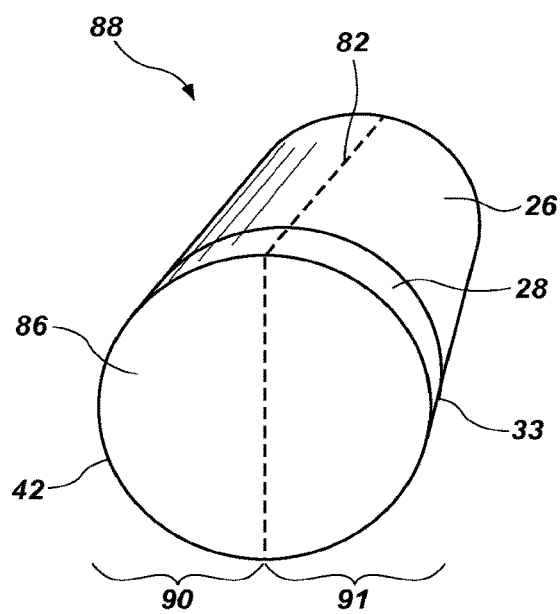
FIG. 33 illustrates a perspective view of a polished cutting element blank prior to being cut.

FIG. 33 illustrates a first single cutting element blank 88, similar to the cutting element 84 of FIG. 31, having a cutting face 86 that has been polished to a substantially constant surface finish roughness. The first blank 88 may have a generally cylindrical shape, although other shapes may be used. The first blank 88 includes a diamond table 28 bonded to a substrate 26. The diamond table 28 possesses the cutting face 86, the outermost edge of which forms the cutting edge 42 by which the first blank 88 may engage and cut the formation. The diamond table 28 may have a chamfered edge (not shown) including one or more chamfer surfaces (not shown). The diamond table 28 also has a side surface 33 extending from the cutting edge 42 to the interface between the diamond table 28 and the substrate 26. FIG. 33 also shows a boundary line 82 imposed on the first blank 88 at a location where the first single cutting element blank 88 is to be cut. The boundary line 82 may be aligned to produce a symmetrical halving cut of the first blank 88, although other alignments are within the scope of the embodiments disclosed herein.

Figure 34:
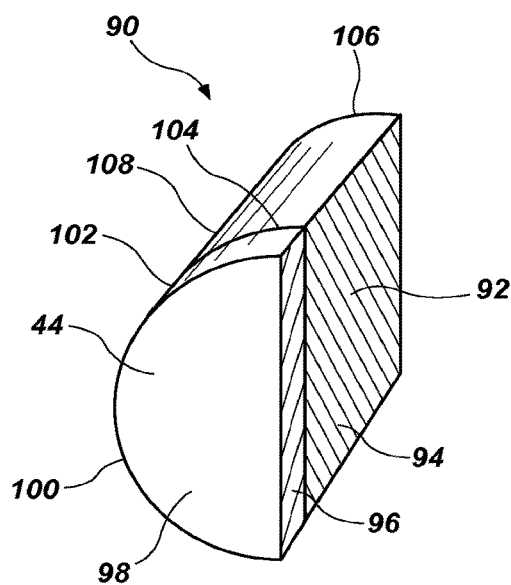
FIG. 34 illustrates a perspective view of the polished cutting element blank of FIG. 33 being cut and separated to form a first half of a multi-friction cutting element.

The first blank 88 may be cut along boundary line 82, separating a first half 90 of the multi-friction cutting element 14 (as shown in FIG. 34) from a remaining first portion 91 of the first single cutting element blank 88. The first half 90 may be characterized as a first cutting unit. Referring now to FIG. 34, the first half 90 may be semi-cylindrical in shape, although other shapes are also within the scope of the embodiments disclosed herein. The cutting process forms a first bonding surface 92 on the first half 90 extending the expanse of the cut. The first bonding surface 92 may be substantially planar; although a non-planar first bonding surface 92 is also within the scope of the embodiments disclosed herein. The first half 90 of the multi-friction cutting element 14 formed by the cutting process includes a first cutting element substrate 94 bonded to a first diamond table 96 thereon. The first diamond table 96 possesses a first cutting face 98, the outermost arcuate edge of which may be defined as a first cutting edge 100. The first diamond table 96 also has a first side surface 102 extending from the first cutting edge 100 to the interface between the first diamond table 96 and the first cutting element substrate 94. The first cutting element substrate 94 may have a first forward end surface 104, and an at least substantially planar first rear end surface 106, and a generally semi-cylindrical first lateral side surface 108 extending between the first forward end surface 104 and the first rear end surface 106.

Figure 35:
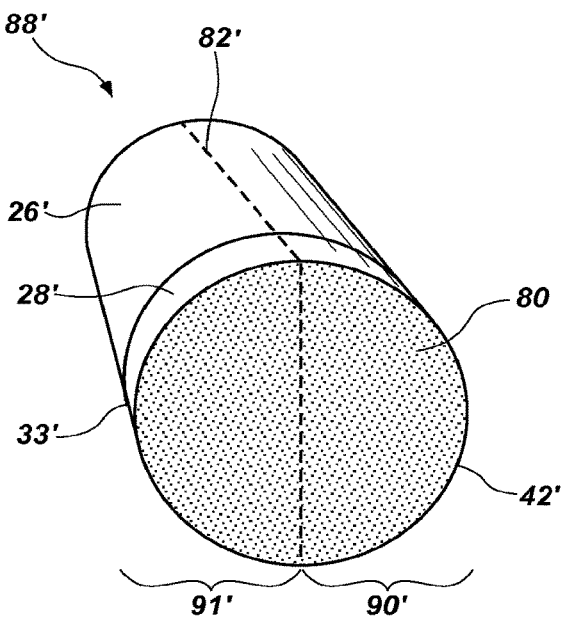
FIG. 35 illustrates a perspective view of an unpolished cutting element blank prior to being cut.

FIG. 35 illustrates a second cutting element blank 88', similar to the cutting element 78 of FIG. 29, having a cutting face 80 with a substantially constant surface finish roughness greater than the surface finish roughness of the cutting face 86 of the first single cutting element blank 88 (FIG. 33). The second cutting element blank 88' may have a generally cylindrical shape, although other shapes may be incorporated. Referring again to FIG. 35, the second cutting element blank 88' includes a diamond table 28' bonded to a substrate 26'. The diamond table 28' possesses the cutting face 80, the outermost edge of which forms a cutting edge 42' by which the second cutting element blank 88' may engage and cut the formation. The diamond table 28' may have a chamfered edge (not shown) including one or more chamfer surfaces (not shown). The diamond table 28' also has a side surface 33' extending from the cutting edge 42' to the interface between the diamond table 28' and the substrate 26'. FIG. 35 also shows a boundary line 82' imposed on the second cutting element blank 88' at a location where the second cutting element blank 88' is to be cut. The boundary line 82' may be aligned to produce a symmetrical halving cut of the second cutting element blank 88', although other alignments are contemplated to be within the scope of the embodiments disclosed herein.

Figure 36:
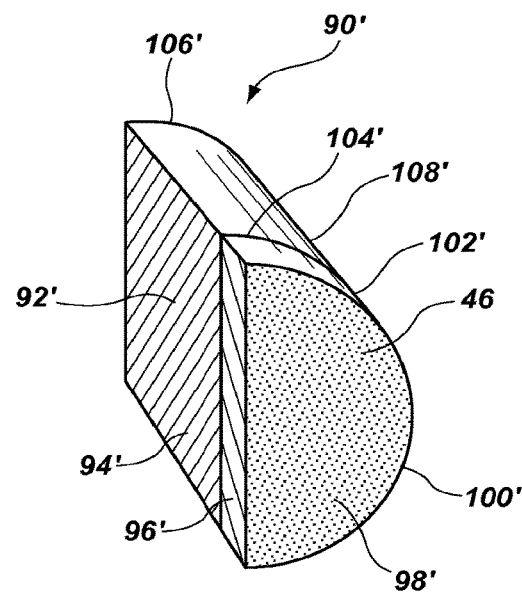
FIG. 36 illustrates a perspective view of the unpolished cutting element blank of FIG. 35 being cut and separated to form a second half of a multi-friction cutting element.

The second cutting element blank 88' may be cut along boundary line 82', separating the second half 90' of the multi-friction cutting element 14 (as shown in FIG. 36) from a remaining second portion 91' of the second cutting element blank 88'. The second half 90' may be characterized as a second cutting unit. Referring now to FIG. 36, with continued reference to FIG. 34, the second half 90' may be semi-cylindrical in shape, although other shapes are also within the scope of the embodiments disclosed herein. Furthermore, the second half 90' may be symmetrical to the first half 90, although symmetry between the first half 90 and the second half 90' is not required. The cutting process forms a second bonding surface 92' on the second half 90' extending the expanse of the cut. The second bonding surface 92' corresponds to the first bonding surface 92 and is configured to be bonded to the first bonding surface 92. The second bonding surface 92' may be substantially planar; although a non-planar second bonding surface 92' is within the scope of the embodiments disclosed herein. The second half 90' of the multi-friction cutting element 14 formed by the cutting process includes a second cutting element substrate 94' bonded to a second diamond table 96' thereon. The second diamond table 96' may comprise a multi-layer diamond table 96' while the first diamond table 96 may comprise a single-layer diamond table 96, and vice versa. Furthermore, the second diamond table 96' may comprise a different volume percentage of diamond material than the volume percentage of diamond material of the first diamond table 96.

The second diamond table 96' possesses a second cutting face 98', the outermost arcuate edge of which may be defined as a second cutting edge 100'. The second diamond table 96' also has a second side surface 102' extending from the second cutting edge 100' to the interface between the second diamond table 96' and the second cutting element substrate 94'. It is to be appreciated that the first half 90 of the cutting element 14 may have an interface geometry between the first diamond table 96 and the first cutting element substrate 94 different than the interface geometry between the second diamond table 96' and the second cutting element substrate 94' of the second half 90' of the cutting element 14. The second cutting element substrate 94' may have a second forward end surface 104', and an at least substantially planar second rear end surface 106', and a generally semi-cylindrical second lateral side surface 108' extending between the second forward end surface 104' and the second rear end surface 106'.

Figure 37:
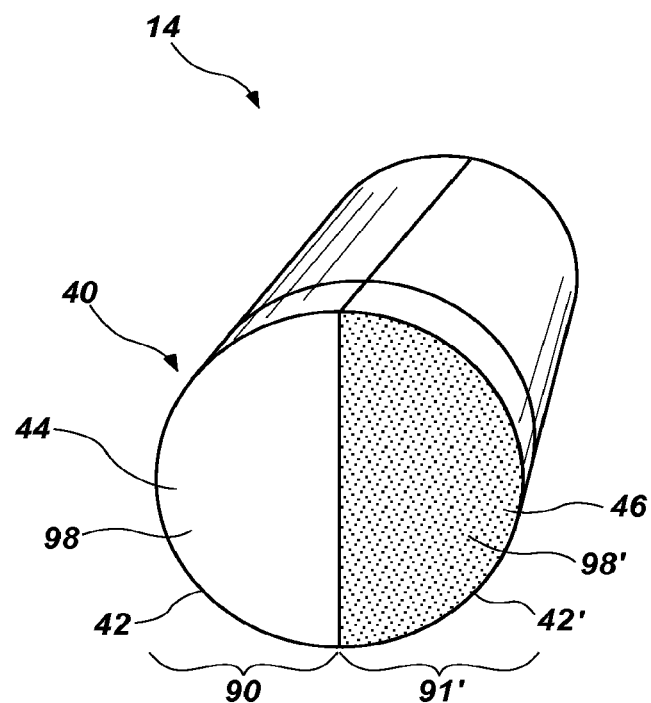
FIG. 37 illustrates a perspective view of a multi-friction cutting element formed by bonding the first and second halves depicted in FIGS. 34 and 36.

After the first half 90 is separated from the first single cutting element blank 88 and the second half 90' is separated from the second cutting element blank 88', the first bonding surface 92 of the first half 90 and the second bonding surface 92' of the second half 90' may be bonded together to form the multi-friction cutting element 14 depicted in FIG. 37. The bonding may be performed by welding or brazing. In embodiments where the first half 90 and the second half 90' are bonded by a brazing method, a brazing alloy, such as a high-silver-content alloy, may be placed between the first bonding surface 92 and the second bonding surface 92' and heated to a temperature of about 1200° F. Additionally, a flux may be used to protect the brazing alloy from oxidation during the brazing process. Alternatively, the first half 90 and the second half 90' may be bonded by an epoxy glue. In additional embodiments, the first half 90 and the second half 90' may be mechanically coupled together, for example, by the use of one or more clamps, locking blocks, bolts, or other mechanical fasteners. Referring now to FIG. 37, after the first half 90 and the second half 90' are bonded together, the first cutting face 98 forms the first area 44 of the cutting face 40, and the second cutting face 98' forms the second area 46 of the cutting face 40. The first area 44 and the second area 46 of the cutting face 40 may possess any of the relative surface finish roughnesses described above. Furthermore, after the first half 90 and the second half 90' are separated from the first and second cutting element blanks 88, 88', respectively, either or both of the first cutting face 98 and the second cutting face 98' may be further polished or roughened to form the desirable relative surface finishes of the first area 44 and the second area 46. These additional finishing processes may be performed before or after the first half 90 is bonded to the second half 90'.

In other embodiments, both the first blank 88 and the second cutting element blank 88' may have an unpolished cutting face. In such embodiments, after cutting the first blank 88 to form the first half 90 and cutting the second cutting element blank 88' to form the second half 90', the first cutting face 98 may be polished to the final desired surface finish roughness of the first area 44 before or after bonding the first half 90 to the second half 90'.

In yet additional embodiments, both the first blank 88 and the second cutting element blank 88' may have a polished cutting face. In such embodiments, after the cutting the first blank 88 to form the first half 90 and cutting the second cutting element blank 88' to form the second half 90', the second cutting face 98' may be roughened to the final desired surface finish roughness of the second area 46 before or after bonding the first half 90 to the second half 90'.

In still further additional embodiments, the first half 90 may be polished after the first blank 88 is cut and either before or after the first half 90 is bonded to the second half 90', while the second half 90' may be roughened after the second cutting element blank 88' is cut and either before or after the second half 90' is bonded to the first half 90.

Additionally, the remaining first portion 91 of the first blank 88 and the remaining second portion 91' of the second cutting element blank 88' may be bonded together using any of the methods described above, and optionally may have their respective cutting faces further processed using any of the methods described above, to form a second multi-friction cutting element from the first blank 88 and the second cutting element blank 88'.

Figure 38:
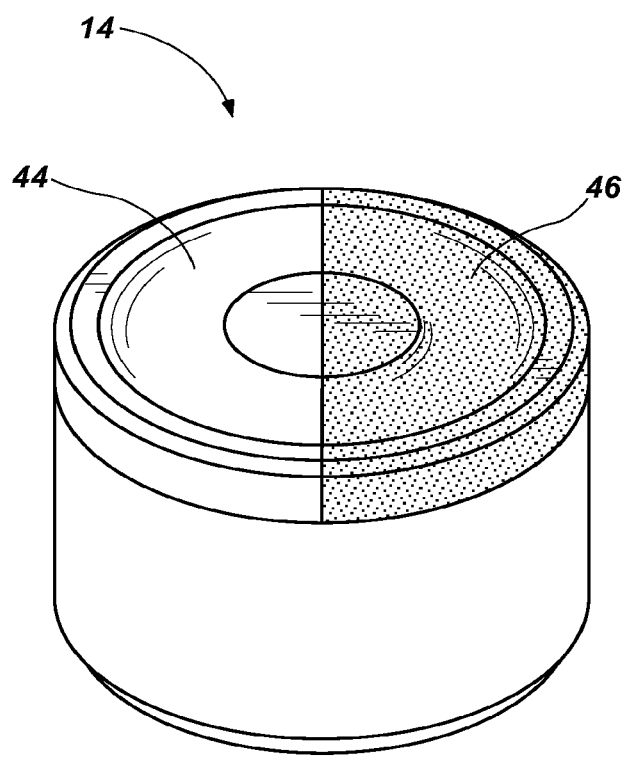
FIG. 38 illustrates a perspective view of a multi-friction cutting element having a non-planar cutting face.

It is to be appreciated that while the cutting element 14 depicted herein has a substantially planar cutting face 40, non-planar cutting face geometries are also within the scope of the embodiments disclosed herein. For example, a cutting element 14 having one or more indentations or grooves in the cutting face 40 of the diamond table 28 (not shown) may be utilized to advantage in accordance to the embodiments disclosed herein, as shown in FIG. 38.

The embodiments disclosed herein enable the formation of a multi-friction cutting element capable of steering formation chip cuttings in a predetermined direction off of the cutting face of the cutting element. Other methods of forming the second area 46 to have a greater coefficient of sliding friction than the first area 44 are considered to be within the scope of the embodiments disclosed herein, such as, for example, using a belt polisher to polish a portion of an unpolished cutting element 14.

While certain illustrative embodiments have been described in connection with the figures, those of ordinary skill in the art will recognize and appreciate that embodiments of the invention are not limited to those embodiments explicitly shown and described herein. Rather, many additions, deletions, and modifications to the embodiments described herein may be made without departing from the scope of embodiments of the invention as hereinafter claimed, including legal equivalents. In addition, features from one disclosed embodiment may be combined with features of another disclosed embodiment while still being encompassed within the scope of embodiments of the invention as contemplated by the inventor.

What is claimed is:

1. A method of forming a cutting element for an earth-boring tool, comprising:
    forming a superabrasive substantially planar cutting face on the cutting element;
    forming a first area of the superabrasive substantially planar cutting face to have a first average surface roughness;
    forming a second area of the superabrasive substantially planar cutting face to have a second average surface roughness greater than the first average surface roughness, the second area comprising two or more portions separated by the first area; and
    further comprising forming the two or more portions of the second area within a first semicircular half of the superabrasive substantially planar cutting face, and forming the first area of the superabrasive substantially planar cutting face within the first semicircular half of the superabrasive substantially planar cutting face, wherein an arrangement of the first area and the second area on a second semicircular half of the superabrasive substantially planar cutting face is different from the arrangement of the first area and the second area on the first semicircular half of the superabrasive substantially planar cutting face.

2. The method of claim 1, further comprising forming the first area of the substantially planar cutting face to have a surface roughness of about 0.1 to about 2 microinches and the second area of the substantially planar cutting face to have a surface roughness of about 10 to about 400 microinches.

3. The method of claim 2, further comprising etching the two or more portions of the second area with a laser.

4. The method of claim 1, further comprising locating the second area to comprise two separate portions on opposite sides of the first area.

5. The method of claim 4, further comprising forming either linear or non-linear boundaries between the first area and the two separate portions of the second area.

6. The method of claim 1, further comprising forming the two or more portions of the second area to comprise a multiplicity of barcode-pattern mutually parallel etch paths.

7. The method of claim 6, further comprising orienting the two or more portions of the second area perpendicular to a diameter of the substantially planar cutting face and extending from the diameter to a periphery of the substantially planar cutting face.

8. The method of claim 6, further comprising orienting the two or more portions of the second area perpendicular to a line at an acute angle with respect to a diameter of the substantially planar cutting face and extending to a periphery of the substantially planar cutting face.

9. The method of claim 1, further comprising forming the two or more portions of the second area to comprise concentric ring portions on the substantially planar cutting face.

10. The method of claim 9, further comprising forming the two or more portions of the second area to comprise segmented ring portions.

11. The method of claim 1, further comprising forming the two or more portions of the second area in a chevron pattern.

12. The method of claim 11, further comprising forming the chevron pattern to comprise linear segments.

13. The method of claim 1, further comprising forming the two or more portions of the second area to comprise mutually parallel linear segments, each segment extending from a diameter of the substantially planar cutting face at an oblique angle thereto to a periphery of the substantially planar cutting face.

14. The method of claim 1, further comprising locating the two or more portions of the second area as a plurality of segments located concentrically about a center of the substantially planar cutting face and spaced inwardly from a periphery thereof.

15. The method of claim 14, further comprising forming at least some segments of the plurality in a polygonal shape.

16. The method of claim 14, further comprising forming at least some segments of the plurality in an elliptical shape.

17. The method of claim 16, wherein forming at least some segments of the plurality in an elliptical shape comprises forming the at least some segments of the plurality in a circular shape.

* * * * *

UNITED STATES PATENT AND TRADEMARK OFFICE
CERTIFICATE OF CORRECTION

PATENT NO. : 11,229,989 B2
APPLICATION NO. : 15/793077
DATED : January 25, 2022
INVENTOR(S) : Juan Miguel Bilen et al.

Page 1 of 1

It is certified that error appears in the above-identified patent and that said Letters Patent is hereby corrected as shown below:

On the Title Page
    In ITEM (72), Line 3,     change "Houston, TX" to --Forest Hill, MD--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*